United States Patent
Eustace

(10) Patent No.: US 12,546,486 B2
(45) Date of Patent: Feb. 10, 2026

(54) TUBING INSTALLATION SYSTEMS

(71) Applicant: Bill Eustace, Colorado Springs, CO (US)

(72) Inventor: Bill Eustace, Colorado Springs, CO (US)

( * ) Notice: Subject to any disclaimer, the term of this patent is extended or adjusted under 35 U.S.C. 154(b) by 0 days.

(21) Appl. No.: 16/417,398

(22) Filed: May 20, 2019

(65) Prior Publication Data

US 2020/0011541 A1  Jan. 9, 2020

Related U.S. Application Data

(60) Provisional application No. 62/674,507, filed on May 21, 2018.

(51) Int. Cl.
  *F24D 3/14* (2006.01)
  *F24D 3/12* (2006.01)

(52) U.S. Cl.
  CPC ............. *F24D 3/146* (2013.01); *F24D 3/125* (2013.01); *F24D 3/141* (2013.01); *F24D 3/142* (2013.01); *F24D 3/149* (2013.01)

(58) Field of Classification Search
  CPC .......... F24D 3/125; F24D 3/141; F24D 3/142; F24D 3/146; F24D 3/149; E04B 5/48; F23D 3/125; F23D 3/141; F23D 3/142; F23D 3/146; F23D 3/149
  USPC .......................................................... 237/69
  See application file for complete search history.

(56) References Cited

U.S. PATENT DOCUMENTS

| | | | | |
|---|---|---|---|---|
| 3,874,910 A * | 4/1975 | Altmann | ............... | F24D 13/024 264/160 |
| 4,109,859 A * | 8/1978 | Durst | .................... | F24D 3/148 165/49 |
| 4,250,674 A * | 2/1981 | Feist | ...................... | E04B 5/48 D25/138 |
| 5,078,203 A * | 1/1992 | Shiroki | .................. | F24D 3/142 165/56 |
| 6,552,310 B1 * | 4/2003 | Hulldin | .................. | F24D 13/02 219/217 |
| 7,250,570 B1 * | 7/2007 | Morand | .................. | H05B 3/06 174/37 |
| 8,176,694 B2 * | 5/2012 | Batori | .................. | E04F 15/185 52/220.2 |
| 9,890,959 B2 * | 2/2018 | Houle | ...................... | E04B 5/48 |
| 10,100,517 B2 * | 10/2018 | Liang | .................. | E04F 15/182 |

(Continued)

FOREIGN PATENT DOCUMENTS

FR  2993637 B1 *  8/2019  ............. F24D 3/125

OTHER PUBLICATIONS

Machine translation of FR2993637B1 (Year: 2023).*

*Primary Examiner* — Edelmira Bosques
*Assistant Examiner* — Deepak A Deean
(74) *Attorney, Agent, or Firm* — Dorsey & Whitney LLP

(57) ABSTRACT

A radiant heating installation system is provided herein. The system includes a radiant heating tubing defining a tubing run. The system can include a first removable positioning fixture that receives a portion of the radiant heating tubing and temporarily restrains the radiant heating tubing in a deflected configuration. The system can also include a second removable positioning fixture configured to that receives a second portion of the radiant heating tubing and temporarily restrains the radiant heating tubing along a run of the radiant heating tubing.

20 Claims, 17 Drawing Sheets

(56) References Cited

U.S. PATENT DOCUMENTS

| | | | |
|---|---|---|---|
| 2005/0224690 A1* | 10/2005 | Hobbs | E01C 9/001 249/2 |
| 2009/0026192 A1* | 1/2009 | Fuhrman | H05B 3/06 219/523 |
| 2009/0199995 A1* | 8/2009 | Hawkinson | F24D 3/143 165/49 |
| 2014/0069605 A1* | 3/2014 | Sullivan | B21D 47/00 165/56 |
| 2014/0245681 A1* | 9/2014 | Carrubba | E04F 13/0894 52/404.4 |
| 2016/0047131 A1* | 2/2016 | Larson | E04B 5/48 52/173.1 |
| 2018/0017269 A1* | 1/2018 | Houle | F24D 13/02 |

\* cited by examiner

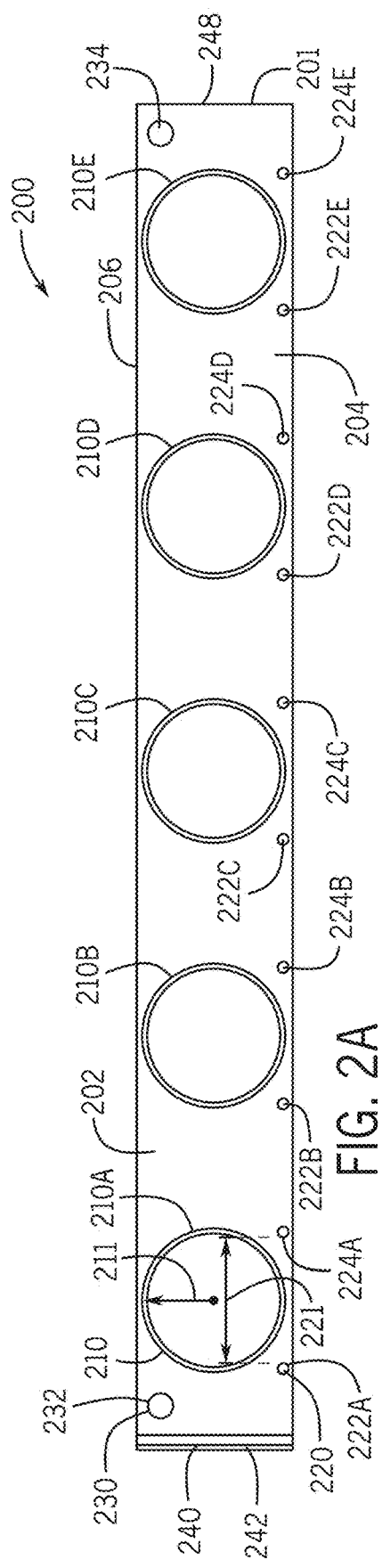
FIG. 2A
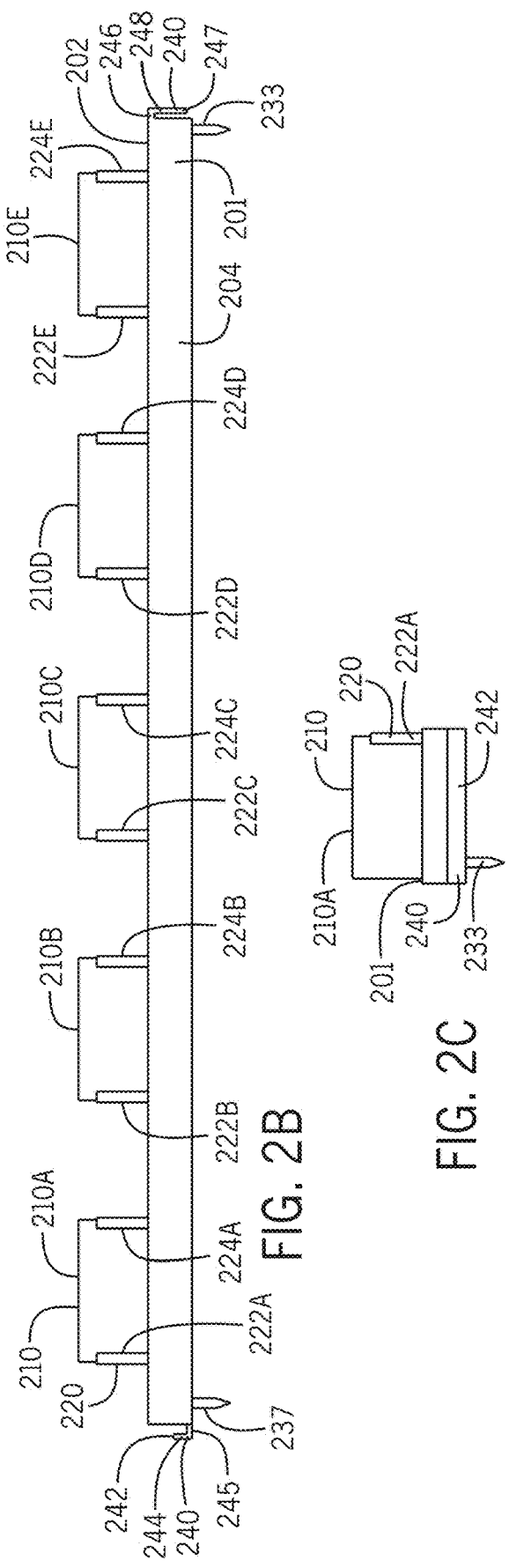
FIG. 2B
FIG. 2C

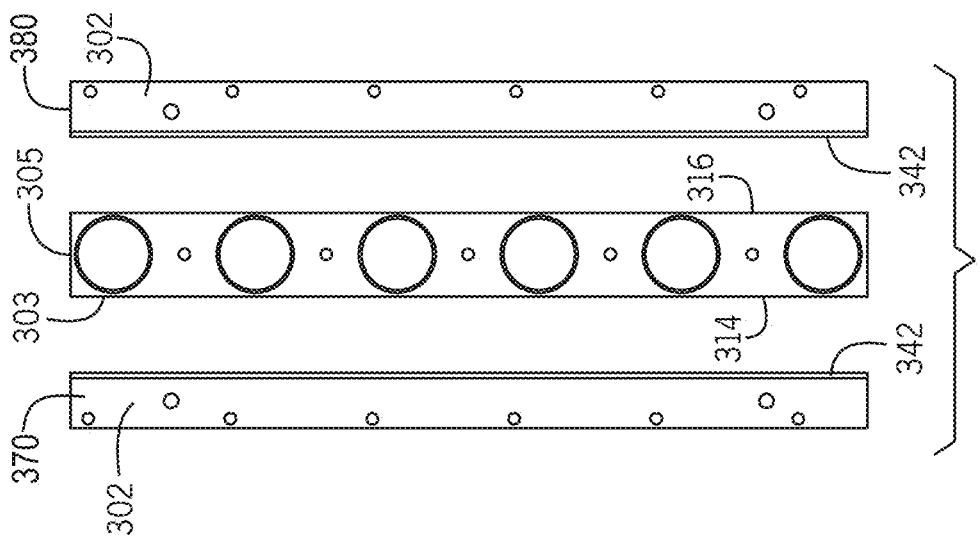
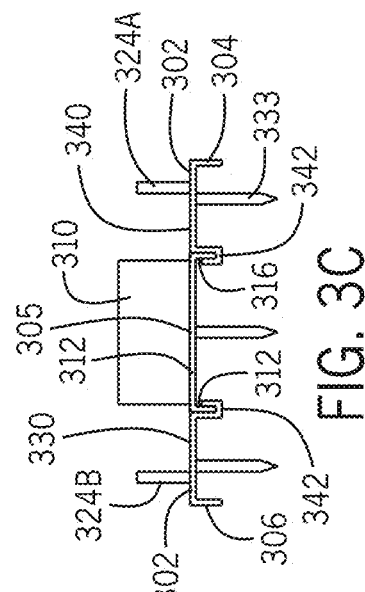
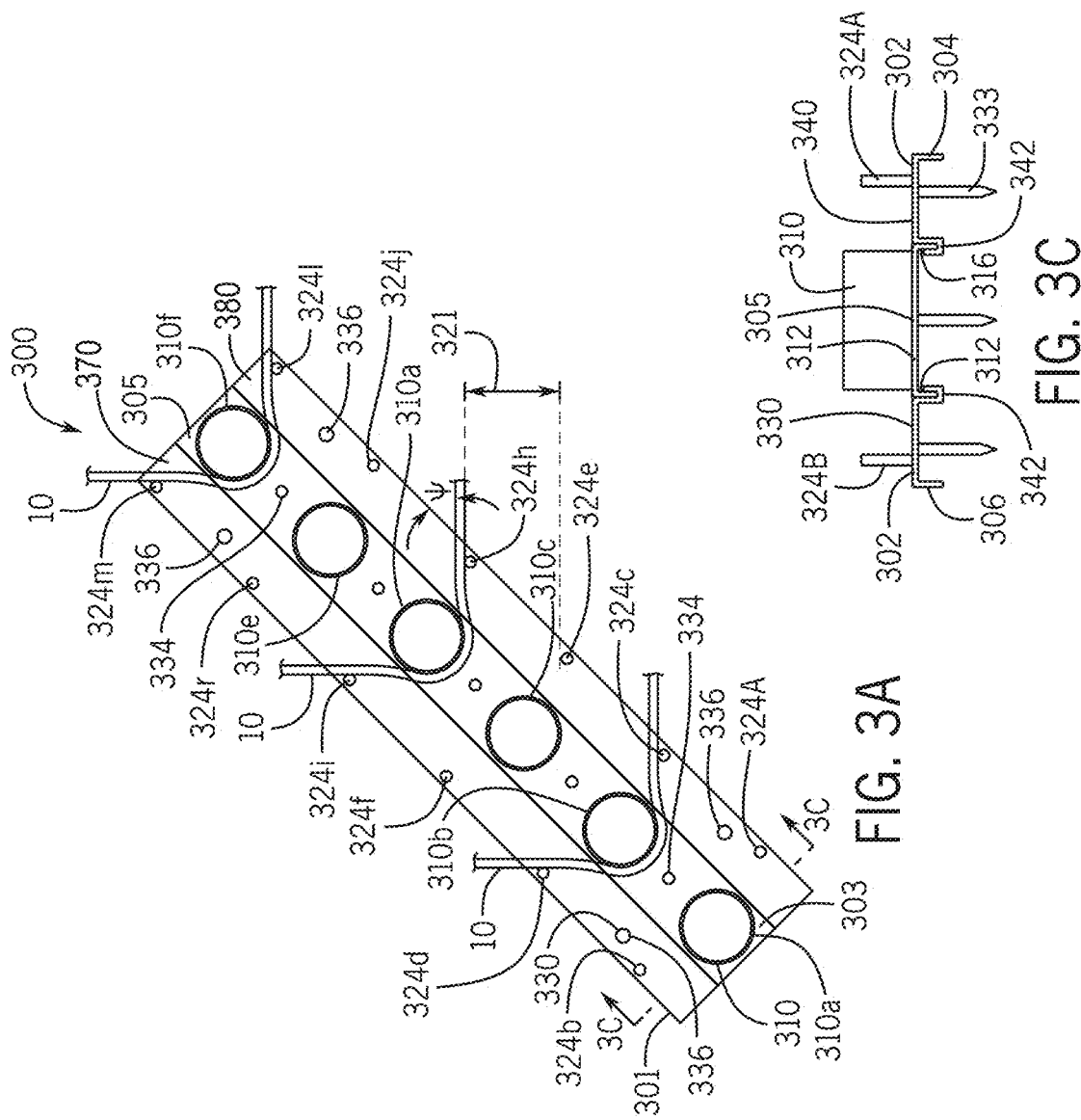

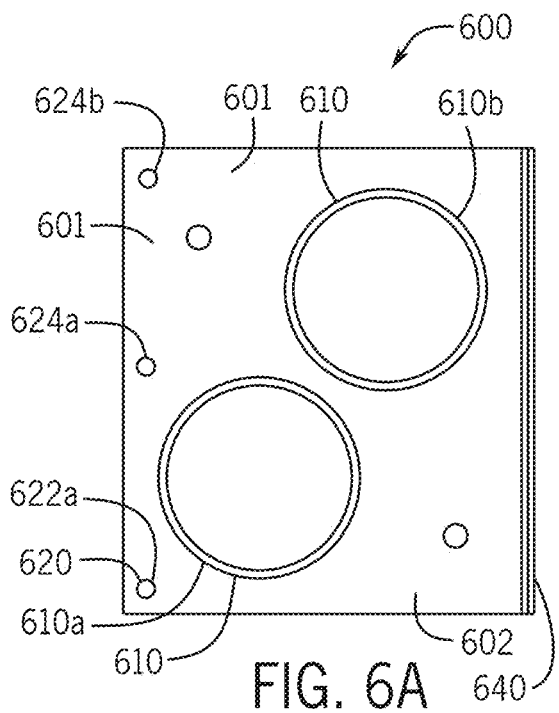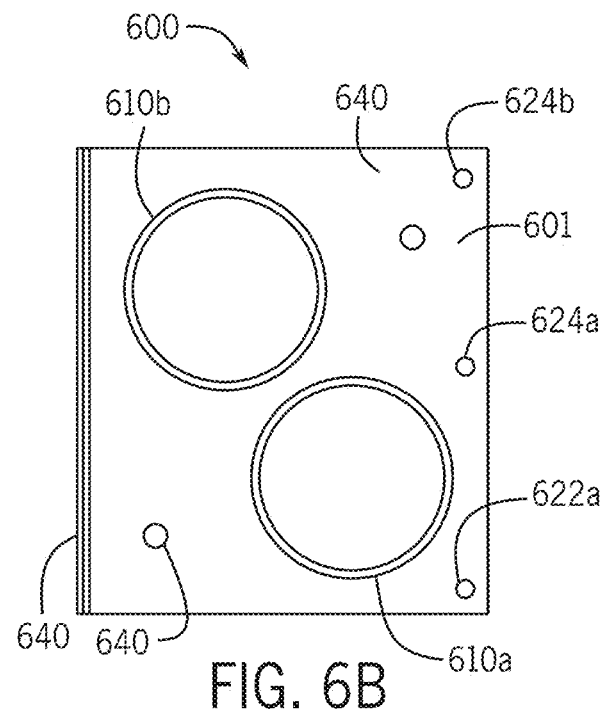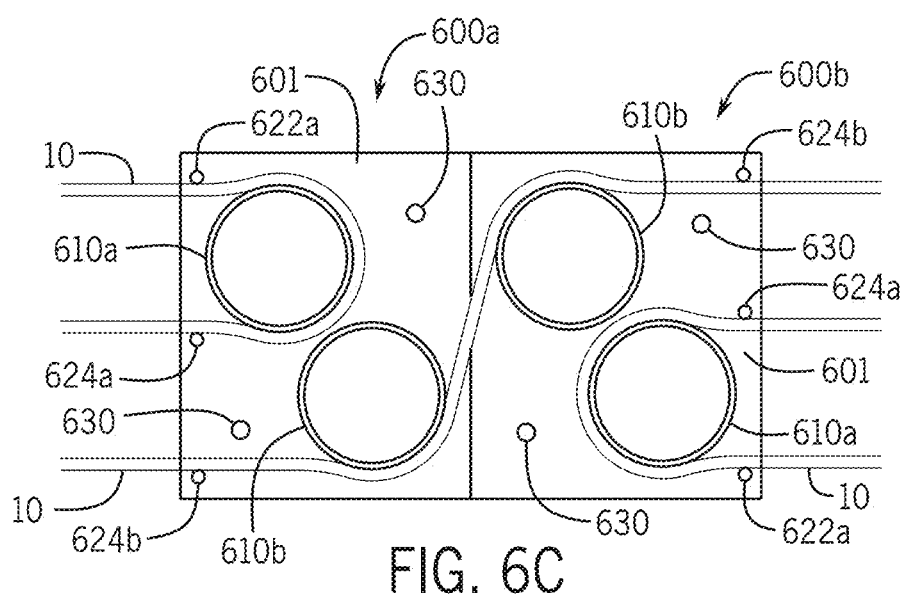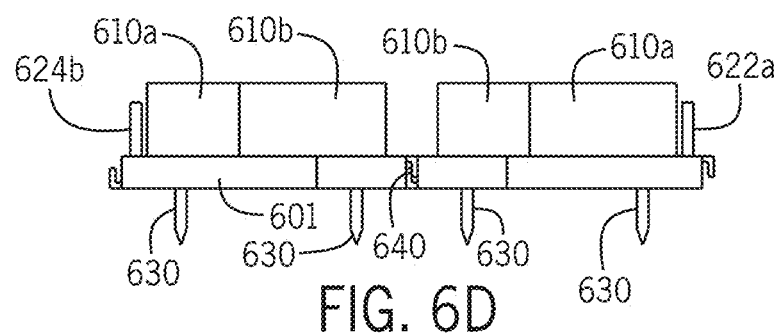

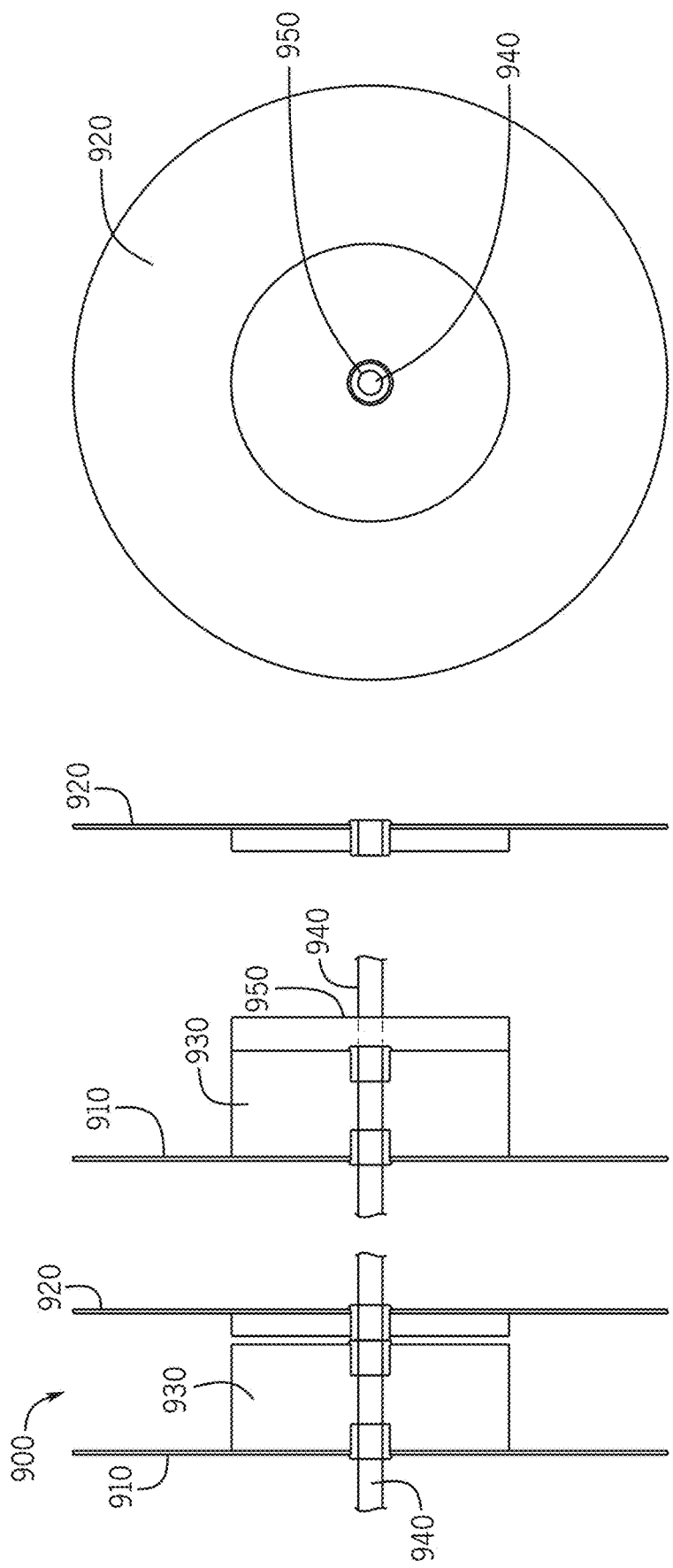

TUBING INSTALLATION SYSTEMS

CROSS-REFERENCE TO RELATED APPLICATIONS

This application claims the benefit of priority of U.S. Provisional Patent Application No. 62/674,507 filed May 21, 2018 and entitled "RADIANT HEATING INSTALLATION SYSTEMS," which is hereby incorporated by reference herein in its entirety.

TECHNICAL FIELD

This invention relates generally to devices, systems, methods, and kits for installation of heating systems and specifically to a radiant heater system.

BACKGROUND

In the construction industry, radiant heating, especially in flooring, is a typical method for providing heat to a building, structure, path, driveway, or other structure. Radiant heating systems utilize continuous runs of material suitable to effect heat transfer with the surrounding structures. Typical examples of this include fluid distribution within tubing or conduit. For example, hot radiant fluid can be circulated through the tubes to provide heat transfer from the radiant fluid to the structure such as the interior of a building through the concrete floor.

As is common in the construction industry, constructing radiant heat flooring, a steel wire grid is laid out as part of the foundation of the structure. Fluid distribution tubing is then laid down in an engineered pattern on top of the wire grid. For example, the tubing is laid down along parallel runs having 6-inch centers with 9-inch loops on each end as specified by industry standards for traditional tubing such as PEX tubing. In the layout, the tubing is parallel to some of the wires and perpendicular to others. Once laid out, the tubing is fastened to the wire grid and concrete is poured around the grid, tubing, and other structural features forming the floor. As can be appreciated, laying out the tubing for the radiant heat flooring is extremely time-consuming and labor intensive. Following the engineered layout, fastening the tubing to the grid, maintaining the specified loops and spacing results in a very slow and inefficient installation project. Construction projects for buildings having 25,000-50,000 square feet are very common and can result in the tubing length being greater than 50 miles. The length of the tubing to be installed coupled with the inefficient installation process results in excessive costs and labor requirements for these projects.

Unless otherwise indicated herein, the materials described in this section are not prior art to the claims in this application and are not admitted to be prior art by inclusion in this section. The information included in this Background section of the specification, including any references cited herein and any description or discussion thereof, is included for technical reference purposes only and is not to be regarded as subject matter by which the scope of the invention as defined in the claims is to be bound.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 2A-C are illustrations of an end loop fixture from top, side, and end view respectively in accordance with at least some embodiments provided herein;

FIG. 3A-C are illustrations of an angled deflection fixture from top, side, and end view respectively in accordance with at least some embodiments provided herein;

FIG. 6A-C are illustrations of a partial span end loop fixture from top mirror images (FIG. 6A and FIG. 6B), top partial span pair (FIG. 6C), and an end view of a partial span pair (FIG. 6D) in accordance with at least some embodiments provided herein;

FIG. 10A-D are illustrations of tubing spool from a full end view (FIG. 10A), an end view with flange remove (FIG. 10B), an end view of a flange (FIG. 10C), and a side view in accordance with at least some embodiments provided herein;

Figure 1:
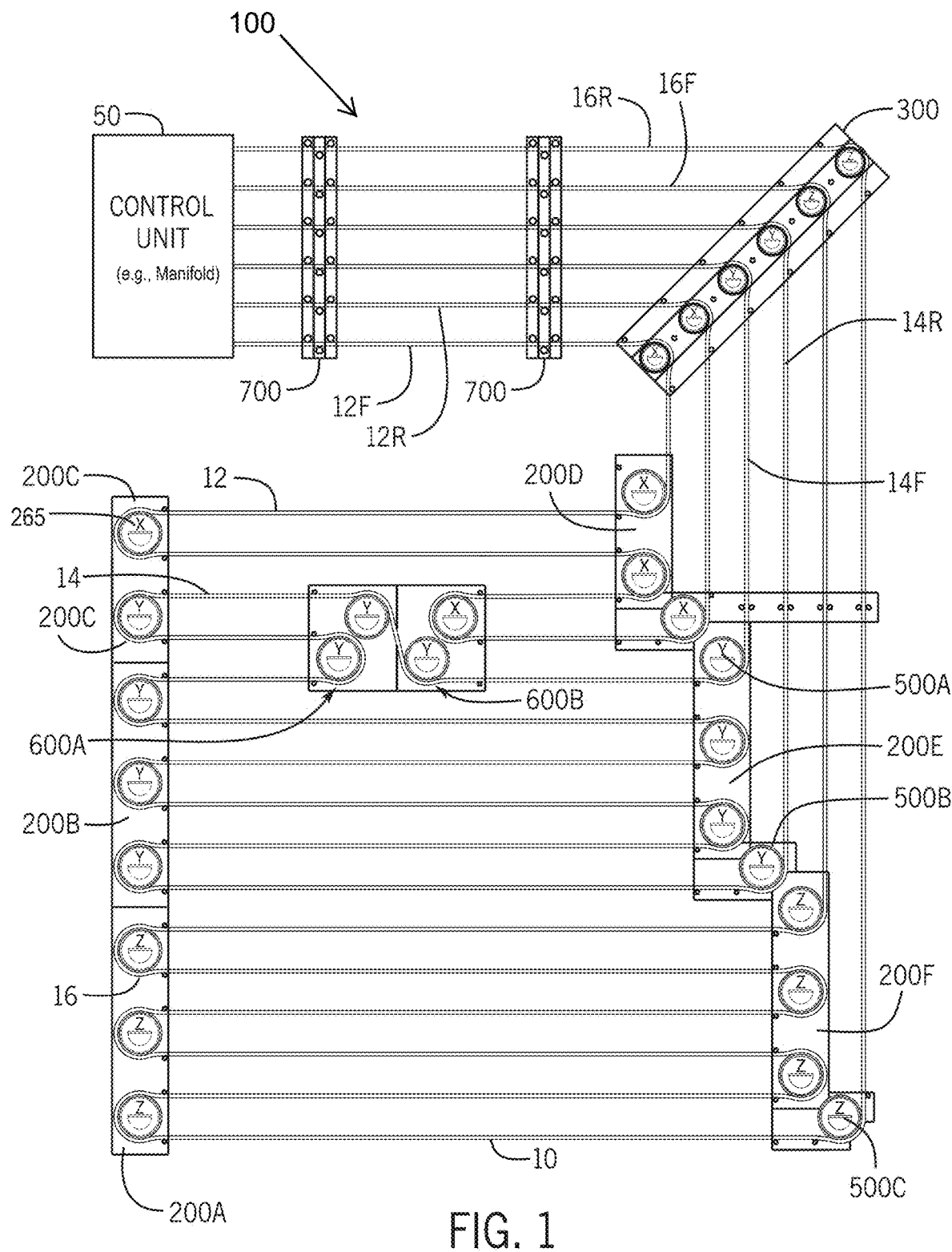
FIG. 1 is a schematic illustration top view of a radiant heating tubing installation system in accordance with various embodiments.

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, products, devices, and/or apparatus generally related radiant heating systems and installation devices and methods for the same. Radiant heating systems utilize continuous runs of material suitable to effect heat transfer with the surrounding structures. In various embodiments, hollow tubing or conduit are configured for heating or cooling fluid to be distributed along the length thereof enabling heat transfer with the surrounding structures. The tubing or conduit generally includes, but is not limited to, PEX tubing. As used herein the tubing or conduit will generally be referred to as tubing. In other embodiments, length of wire may be laid out and configured for electrical radiant heating. Any of these radiant heating structures may incorporate the various aspects, embodiments, and examples of the devices, systems, and methods discussed herein. However, for the sake of simplicity, the radiant heating materials will be generally described via the embodiment of fluid based radiant heating systems.

In accordance with various embodiments and as illustrated in FIG. 1, a radiant heating tubing installation system 100 can be provided for significant time, labor, and cost reductions in the installation of the radiant heating tubing. Radiant heating systems can include multiple zones (i.e., areas of coordinated temperature control) with multiple runs (i.e., engineered lengths of tubing configured for the desired heat distribution within a zone) of the tubing within each zone. As illustrated in the example of FIG. 1, the sample zone includes three runs 12, 14, and 16 of tubing 10. Each run 12, 14, and 16 has a feed tube 12F, 14F, 16F that transports fluid out of a manifold 10 and a return tube 12R, 14R, 16R returning the fluid back to the manifold 10. As is appreciated by persons of ordinary skill in the art, any number of runs and zones can be implemented into a project. The examples provided herein are merely simplified examples presented to understand the concepts of the radiant heating tubing installation system 100 provided herein. Prior to laying out the tubing, the specific locations, lengths, runs, and zones are engineered to create the desired heat distribution. Once the construction project begins, the tubing is laid out along the engineered routes. In accordance with the various embodiments discussed herein, an installation system 100 can be provided and utilized to layout the tubing along the engineered routes.

In accordance with various embodiments, the tubing installation system 100 can include one or more installation fixtures/jigs. The installation fixtures are configured to hold at least one dimension, position, orientation, or other aspect of the tubing 10 in place during installation of the system as a whole. Specifically, the installation fixtures are configured to hold the tubing 10 in place while the system is being laid out and then the tubing installation system 100 can be removed once the tubing 10 has been permanently attached to a permanent structure, e.g., wire tied to the metal grid in a poured floor or staked to the ground under pavers in a snow melt application.

In various embodiments, as illustrated in FIG. 1, the tubing installation system 100 can include one or more end loop fixtures 200. The end loop fixtures 200 can be configured to position end loops (i.e., approximately 180° turns in the tubing 10) on the tubing 10 which define the edge of a particular run of tubing 10 (e.g., runs 12, 14, 16). By utilizing opposing end loop fixtures 200 (e.g. 200a opposed by 200f), the end loop fixtures 200 can establish parallel runs in the tubing 10 between the tubing's end loops. Additionally, multiple end loop fixtures 200 can be end to end to run the length of a heating zone such as the one shown in FIG. 1. For example, end loop fixtures 200a, 200b, 200c can form one edge of the zone. End loop fixtures 200d, 200e, 200f can form the other edge of the zone. As shown, the different end loop fixtures can be different sizes. For example, end loop fixtures 200a and 200b has three end loop turns, whereas end loop fixture 200c has two end loop turns.

In various embodiments, as illustrated in FIG. 1, the tubing installation system 100 can include one or more angled deflection fixtures 300. The angled deflection fixtures 300 can be configured to position bends (i.e., tubing 10 direction changes with less than 180° turns), which define a direction change in a particular run of tubing 10 (e.g., runs 12, 14, 16). By utilizing an angled deflection fixture 300, the various runs 12, 14, 16 of tubing 10 can make a direction change while maintaining parallel runs with a consistent center-to-center measurement between the adjacent runs. For example, 6-inch center-to-center spacing is a common specification for radiant heating tubing, and the angled deflection fixture 300 can be configured to maintain that 6-inch center-to-center spacing around a bend and the resulting direction change maintaining the substantially parallel layout of the tubing 10 in the adjacent runs. It should be appreciated that in other embodiments, the angled deflection fixture 300 can have various other geometries that maintain center-to-center spacing for other dimensions than 6-inches. The angled deflection fixture 300 can also be configured to maintain a specified bend radius. For example, a 9-inch bend radius is common for PEX tubing used in many construction applications. Thus, the angled deflection fixture 300 can maintain the 9-inch bend radius around the bends and then direct the tubing back to the desired center-to-center spacing such as 6-inch center-to-center spacing.

In various embodiments, the tubing installation system 100 can include angled end loop fixtures 400. The angled end loop fixtures 400 can be configured to position end loops (i.e., approximately 180° turns in the tubing 10) along runs of the tubing 10 which define an angled edge within a zone of the tubing 10. FIG. 1 illustrates an example of one edge of the zone terminating orthogonally with respect to the runs (e.g., runs 12, 14, 16) of tubing 10. Specifically, the end loop fixtures 200a, 200b, 200c are positioned orthogonally to the runs 12, 14, 16 of tubing 10. However, in other embodiments, not shown in FIG. 1 (see FIG. 4 instead) one edge of the zone may terminate at an angle to the run of tubing 10. By utilizing angled end loop fixtures 400, the various runs 12, 14, 16 of tubing 10 can make parallel runs in the tubing 10 between the tubing's end loops, while accommodating an edge of the zone that is non-orthogonal to the run direction. For example, in some buildings a room might not be square. One wall may be positioned at an angle to other walls. In such an application, the angled end loop fixtures 400 can accommodate this more complicated geometric environment, while maintaining parallel runs with a consistent center-to-center measurement between the adjacent runs. As indicated, 6-inch center-to-center spacing is a common specification for radiant heating tubing, and the angled end loop fixtures 400 can be configured to maintain that 6-inch center-to-center spacing around a bend and the resulting direction change maintaining the substantially parallel layout of the tubing 10 in the adjacent runs. The angled end loop fixtures 400 can also be configured to maintain a specified turn radius. For example, a 9-inch turn radius is common for PEX tubing used in many construction applications. Thus, the angled end loop fixtures 400 can maintain the 9-inch turn radius around the turns and then direct the tubing back to the desired center-to-center spacing such as 6-inch center-to-center spacing.

In various embodiments, as illustrated in FIG. 1, the tubing installation system 100 can include one or more staggered bend fixtures 500. The staggered bend fixtures 500 can include a bend fixture and/or a guide fixture. The bend fixture can be configured to position bends (i.e., tubing 10 direction changes with less than 180° turns) in the tubing 10, allowing for a direction change in a particular run of tubing 10 (e.g., runs 12, 14, 16). More specifically, the staggered bend fixtures 500 locates the bend fixture relative to an adjacent fixture, such as an end loop fixture 200 such that the tubing 10 can be routed around the end loop fixture 200 while maintaining the desired center-to-center parallel separation and/or the desired turn radius. As illustrated in FIG. 1, a staggered bend fixture 500a routes run 12 of tubing 10 around the end loop fixture 200d. A staggered bend fixture 500b routes run 14 of tubing 10 around the end loop fixture 200e. A staggered bend fixture 500c routes run 16 of tubing 10 around the end loop fixture 200f. While in various embodiments, the staggered bend fixture can be utilized alone to route the tubing 10 as desired around other fixtures; in other embodiments, the staggered bend fixture is used in conjunction with a guide fixture. For example, the staggered bend fixture 500a includes a guide fixture that positions runs 14 and 16 at the desired center-to-center distance parallel with run 12 as run 12 bends around the staggered bend fixture 500a on its home run path back to manifold 50. Similarly, the staggered bend fixture 500b includes a guide fixture that positions run 16 at the desired center-to-center distance parallel with run 14 as run 14 bends around the staggered bend fixture 500b on its home run path back to manifold 50. As run 16 has the most distant home run path from manifold 50, the staggered bend fixture 500c does not include a guide fixture for positioning additional runs. As with the other fixtures discussed herein, it should be appreciated that the staggered bend fixture 500 is configured to maintain center-to-center spacing for desired dimensions such as 6-inch center-to-center dimensions. The staggered bend fixture 500 can also be configured to maintain a specified bend radius such as the 9-inch bend radius common for PEX tubing used in many construction applications. Thus, the staggered bend fixture 500 can maintain the 9-inch bend radius around the bends and then direct the tubing back to the desired center-to-center spacing such as the 6-inch center-to-center spacing as an example.

In various embodiments, the tubing installation system 100 can include one or more partial span end loop fixtures 600. The partial span end loop fixtures 600 can be configured as a length control for a run of tubing 10. For example, the partial span end loop fixtures 600 can be configured to position a turn or bend part way across a span of the tubing 10. A span being defined as the distance between the majority of turns in a run of tubing 10 or in a group of runs of tubing 10. For example, as shown in FIG. 1, a span is the distance between any of 200a to 200f, 200b to 200e, 200c to 200d, or any combinations thereof. Additionally or alternatively, the partial span end loop fixtures 600 can be configured to position a turn or bend part way along one run of tubing 10 or multiple runs of tubing 10. For example, FIG. 1 illustrates the partial span end loop fixtures 600 forming turns in both runs 12 and 14. The partial span end loop fixtures 600 also forms a bend along run 14. By forming the turn in run 12, the length of run 12 can be controlled because the final turn in the run 12 can occur at any distance across the span between the end loop fixtures 200c to 200d and then the run 12 can return to manifold 50. By moving the partial span end loop fixture 600 closer to the end loop fixture 200c, the length of run 12 is lengthen. By moving the partial span end loop fixture 600 closer to the end loop fixture 200d, the length of run 12 is shortened. Thus, utilizing the partial span end loop fixture 600 allows for fine-tuned control of tubing 10 length. Additionally or alternatively, the partial span end loop fixture 600 can be configured to route the next run 14 of tubing 10 around the final turn of run 12, thereby continuing the path of tubing 10 across the span via the next run 14 after run 12 is ended due to the final turn. In accordance with various embodiments, the partial span end loop fixture 600 includes multiple fixtures 600a and/or 600b.

In various embodiments, the tubing installation system 100 can include one or more intermediate guides 700. The intermediate guides 700 are configured to maintain center-to-center position of the tubing 10 across long spans between turns, bends, or other similar features. For example, as illustrated in FIG. 1, the intermediate guide 700 is positioned along the span that extends between the manifold 50 and the angled deflection fixture 300. Here, the intermediate guide 700 is positioned to maintain the consistent center-to-center distance of run 12f, 12r, 14f, 14r, 16f, and 16r as each of the tubes extend between the manifold 50 and the angled deflection fixture 300.

In accordance with various embodiments, as illustrated in FIG. 1, each fixture or portion of each fixture in an installation system 100 can be marked with an identifier. The identifiers mark the specific paths, turns, bends, or other features to follow or otherwise associate each of the specific runs 12, 14, and 16. The fixtures can be marked with any suitable identifier that is sufficient to allow a laborer to identify quickly which run of tubing belongs on which fixture so that the tubing 10 can be distributed quickly along the path during installation. Identifiers can include permanent or replicable markers having colors (e.g., red, green, blue, orange, black, etc.), textures, text (e.g. numbers, letters, words, symbols, etc.), or any other suitable visual aid. For example, one or more of the turns on the end loop fixtures 200 can be marked with an identifier 265 (shown generically in FIG. 1 by way of example with "X", "Y", and "Z"). The identifiers mark the specific turns to be used for each of the specific runs 12, 14, and 16. For example, as shown in FIG. 1, run 12 corresponds to identifier Z, run 14 corresponds to identifier Y, and run 16 corresponds to identifier X. The identifiers can attach to the fixtures, can be a part of the fixtures, or can be placed on or within the fixtures. For example, identifiers 265 shown in FIG. 1 are placed within the deflectors. Here the identifiers are round disks with an upturned tab cut therein for easily grasping the identifier.

FIGS. 2A-C are illustrations of the end loop fixture 200, arranged in accordance with at least some embodiments described herein. FIGS. 2A-C shows an example of end loop fixture 200 having multiple deflection regions. In accordance with various embodiments, the deflection regions are configured such that the tubing turns back on itself and travels in the opposite direction or makes a 180° turn. In fixture embodiments configured to make this turn, the deflection regions are referred to herein as turns. However, each of the fixtures with turns can be configured to create less than a 180° turn as well such that the turns can also be utilized as a deflection region. It is appreciated, however, that this is merely an example of an end loop fixture 200 and that an end loop fixture can have any number of turns such as 1 turn, 2 turns, 3 turns, 4 turns, 5 turns, or greater than 5 turns. In accordance with various embodiments, an end loop fixture 200 can include one or more turns 210 configured to define the radius or curvature 211 of the tubing 10 around the turn. In accordance with various embodiments, an end loop fixture 200 can include one or more guide elements 220 configured to position the tubing 10 around the turn and/or establish the center-to-center distance of one portion of tubing 10 relative to the adjacent portion of tubing 10. In accordance with various embodiments, an end loop fixture 200 can include one or more connectors 240 configured for connecting the end loop fixture 200 to an adjacent fixture. In accordance with various embodiments, an end loop fixture 200 can include one or more support structures 201 configured to support the turn 210 and/or the guide elements 220 relative to one another. In accordance with various embodiments, an end loop fixture 200 can include one or more anchors 230 configured to anchor the end loop fixture 200 to the desired location on the construction surface.

In accordance with various embodiments, the turns 210 include suitable structure to define a minimum radius of the tubing 10. In a preferred embodiment, the turns 210 include an exterior surface that contacts the tubing 10. However, in other embodiments, the turn 210 is a discontinuous structure such as multiple studs that define a radius or a portion of a radius to route the tubing 10 around. In embodiments, in which the turn 210 includes an exterior surface, the surface may be a portion of a cylinder (e.g. less than a full cylinder such as a half cylinder or less), but in alternative examples, the surface is fully cylindrical. The turns 210 have a height that is sufficient to retain the tubing 10 during a layout process while the tubing 10 is extended from fixture to fixture. However, the height is also sufficiently small to allow the end loop fixture 200 to be pulled out from under the tubing 10 after the tubing is properly secured to the construction material. As illustrated by way of example in FIGS. 2A-C, the turn 210 is formed by a sheet metal cylinder, but as discussed in more detail below the turn 210 can be formed from other materials or processes. As illustrated by way of example in FIGS. 2A-C, the end loop fixture 200 includes turns 210a-e. However, as discussed above, it is to be appreciated that fewer or more turns can be provided as part of a single end loop fixture 200. Other structures for the turn 210 are also contemplated herein including, without limitation, clamps, brackets, straps, mandrels, stakes, or other structures suitable to retain and/or direct the path of tube 10.

In accordance with various embodiments, the guide elements 220 include a suitable structure to redirect the direction of the tubing 10. For example, the guide elements can hold or direct the tubing 10 such that tubing 10 generally follows the turn 210 allowing the tubing 10 to form a bend or loop around the turn 210. In one example, guide element 220 is a protrusion that is located adjacent to turn 210 such that when the tube is routed between the guide element 220 and the turn 210, the guide element 220 overcomes the tendency of the tube 10 to straighten out or flex away from turn 210. In one example, the guide elements 220 are biased to one side of the turn 210. The guide elements 220 may be positioned such that as the tube feeds into and departs from turn 210 as either a bend or a turn, the tube 10 contacts the guide elements 220. In one example, guide elements 222 and 224 are positioned such that the tube 10 passes between the guide elements 222 and 224 as it feeds into and exits from the turn 210. In accordance with various embodiments, each turn 210 on the end loop fixture 200 can have an entry guide element 222a-e and an exit guide element 224a-e. The space between the guide elements 221 may be selected such that the tube 10 is forced back into the desired center-to-center distance (e.g. 6-inches) after forming the desired radius of the turn (e.g. 9-inches). It should be noted that these distances can be the same or different. In accordance with one example, as illustrated in FIGS. 2A-C, the guide elements 220 are defined by studs or protrusions. The protrusions are biased to the side of turn 210 on which the tube 10 extends from the turn. The guide elements 220 are separated from each other by a distance 221 sufficient to set the desired center-to-center distance of the tube. In other examples, the guide elements may restrain the tube 10 with a pair of elements on each portion of the tube 10 feeding into and exiting from the turn 210. For example, entry guide element 222 could include two studs or posts and the exit guide element could include two studs or posts, with each pair separated from each other by approximately the outside diameter of the tube 10. In accordance with various embodiments, the guide elements 220 may be from ⅛ inch to 1 inch in diameter. In some examples, the posts are from ¼ to ¾ inches in diameter. In some more particular examples, the posts are about ½ inches in diameter.

In accordance with various embodiments, the guide element 222 and the guide element 224 are positioned with respect to the deflection region 210 such that an association between the first tubing guide element 222, the second tubing guide element 224, and the deflection region 210 is configured to direct the tubing 10 away from the deflection region 210 on each side thereof and between the first tubing guide element 222 and second tubing guide element 224. In accordance with some embodiments, the distance 221 between the first tubing guide element 222 and the second tubing guide element 224 is less than the diameter of the deflection region 210 plus two times diameter of the tubing 10. In accordance with some embodiments, the distance 221 between the first tubing guide element 222 and the second tubing guide element 224 is less than the diameter of the deflection region 210. In accordance with some embodiments, the distance 221 between the first tubing guide element 222 and the second tubing guide element 224 is greater than the diameter of the deflection region 210, but less than the diameter of the deflection region 210 plus two times diameter of the tubing 10. In accordance with some embodiments, the distance 221 between the first tubing guide and the second tubing guide is sufficiently small to cause the first and second tubing guides to deflect the tubing 10 between ¼ and ⅛ of an inch less than the diameter of the deflection region.

Other structures for the guide elements 220 are also contemplated, including, without limitation, clamps, brackets, straps, or other structures suitable to retain and/or direct the path of tube 10.

In various embodiments, the support structure 201 is configured to position the various features of the end loop fixture 200 relative to one another. In accordance with various embodiments, the support structure 201 includes suitable structure to support the turn 210 or the guide element 220. In various embodiments, the support structure 201 includes suitable structure to maintain the position of turn 210 relative to the guide element 220. In accordance with various embodiments, the support structure 201 includes a surface 202. In various embodiments, the one or more turns 210 and/or the one or more guide elements 220 extend from the surface 202 and/or are located relative to each other via the surface 202. In various embodiments, the support structure 201 includes one or more supports 204, 206 configured to set a surface height of the surface 202. These supports 204, 206 can be walls, standoff, studs, a contiguous body with surface 202, or other features suitable to engage with the surface or construction material on which the fixture rests. In various embodiments, the support structure 201 can include a plurality of interconnected or related components.

In accordance with various embodiments, the connectors 240 include suitable elements to constrain one end loop fixture 200 relative to an adjacent fixture (e.g., adjacent fixtures 200a and 200b shown in FIG. 1). The connector 240 can include any bracket, clamp, clip, anchor, hook, or feature suitable to constrain one side of end loop fixture 200 to an adjacent structure such as another end loop fixture 200. In various examples, the connector 240 can extend from one side of the end loop fixture 200 such that an adjacent connector on the other end loop fixture 200 can be engaged. In a particular example, once side of support structure 201 includes a downward facing hook 248. An opposing side of the support structure 201 can include an upwardly facing hook 242. Thus, when two end loop fixtures 200 are placed side by side, the downward facing hook 248 can engage the upwardly facing hook 242 securing one end loop fixture 200 to the other similar to the example of end loop fixture 200a and 200b shown in FIG. 1. In one embodiment, the upwardly facing hook may be formed by an extension 245 extending outwardly from the support structure 201 (e.g., this can be a sheet metal bend formed on an end sheet metal wall) and then a second extension 244 formed upwardly from 245. The opposite side can include the downwardly facing hook that is formed by an extension 246 extending outwardly from the support structure 201 and then a second extension 247 formed downwardly from 246. In other embodiments, one end loop fixture 200 can be connected to an adjacent fixture via fasteners (such as clamps, screw, bolts, straps, or other hardware). In other embodiments, adjacent fixtures can be positioned freely of one another.

In accordance with various embodiments, the anchor 230 include suitable elements to constrain the end loop fixture 200 relative to the underlying structure such as the construction material, subfloor, wire mesh, ground, or similar structure. The anchor 230 can include any bracket, clamp, anchor, hook, clip, fastener, stake, or other feature suitable to generally constrain the end loop fixture 200 in place during installation of the tubing 10. As tubing 10 is installed around the various fixtures, tension is placed on tubing 10 such that it forms generally straight paths. In the absence of an anchor 230, the fixture 200 would move thus frustrating its purpose. By anchoring end loop fixture 200 in place, tension can be placed on the tubing 10 allowing for an improved installation. In various embodiments, the end loop fixture 200 can include multiple anchors 232, 234. For example, each end of the end loop fixture 200 can have an anchor 230 limiting torque on the end loop fixture 200 when tension is placed on the tubing 10 during installation. In one example, the anchors 230 include apertures 232, 234 that receive a fastener 237, 233, respectively, that can be driven down into the subfloor or ground thereby constraining the end loop fixture 200 to its location.

The various components described in FIGS. 2A-C are merely examples and other variations, including eliminating components, combining components, and substituting components are all contemplated.

FIGS. 3A-C are illustrations of the angled deflection fixture 300, arranged in accordance with at least some embodiments described herein. FIGS. 3A-C show examples of the angled deflection fixture 300 having multiple bends. It is appreciated however, that this is merely an example of an angled deflection fixture 300 and that the angled deflection fixture 300 can have any number of deflection regions such as 1 region, 2 regions, 3 regions, 4 regions, 5 regions, 6 regions (as illustrated in FIGS. 3A and B), or greater than 6 regions. In accordance with various embodiments, an angled deflection fixture 300 can include one or more deflection regions 310 configured to define the radius or curvature of the tubing 10 around the region. In accordance with various embodiments, an angled deflection fixture 300 can include one or more guide elements 320 configured to position the tubing 10 around the deflection region 310 and/or establish the center-to-center distance of one portion of tubing 10 relative to the adjacent portion of tubing 10. In accordance with various embodiments, an angled deflection fixture 300 can include one or more connectors 340 configured for connecting the angled deflection fixture 300 to an adjacent fixture or for connecting portions of the angled deflection fixture 300 to itself. In accordance with various embodiments, an angled deflection fixture 300 can include one or more support structures 301 configured to support the deflection regions 310 and/or the guide elements 320 relative to one another. In accordance with various embodiments, an angled deflection fixture 300 can include one or more anchors 330 configured to anchor the angled deflection fixture 300 to the desired location on the construction surface.

In accordance with various embodiments, the deflection regions 310 include suitable structure to define a minimum radius of the tubing 10. In a preferred embodiment, the deflection regions 310 include an exterior surface that contacts the tubing 10. However, in other embodiments, the deflection regions 310 is a discontinuous structure such as multiple studs that define a radius or a portion of a radius to rout the tubing 10 around. In embodiments, in which the deflection regions 310 includes an exterior surface, the surface may be a portion of a cylinder (e.g. less than a full cylinder such as a half cylinder or less), but in alternative examples, the surface is fully cylindrical. The deflection regions 310 have a height that is sufficient to retain the tubing 10 during a layout process while the tubing 10 is extended from fixture to fixture. However, the height is also sufficiently small to allow the angled deflection fixture 300 to be pulled out from under the tubing 10 after the tubing is properly secured to the construction material. As illustrated by way of example in FIGS. 3A-C, the deflection regions 310 is formed by a sheet metal cylinder, but as discussed in more detail below, the deflection regions 310 can be formed from other materials or processes. As illustrated by way of example in FIGS. 3A-C, the angled deflection fixture 300 includes deflection regions 310a-f. However, as discussed above, it is to be appreciated that fewer or more regions can be provided as part of a single angled deflection fixture 300. Other structures for the deflection regions 310 are also contemplated herein including, without limitation, clamps, brackets, straps, mandrels, stakes, or other forms suitable to retain and/or direct the path of tube 10.

The various components of the angled deflection fixture 300 can be positioned to retain the desired center-to-center dimension 321 of the tube 10, even when the angled deflection fixture 300 is positioned at angle Ψ relative to the direction of the tube 10 extending therefrom. Any angle can be provided for by adjusting the spacing between the deflection region 310 and the guide elements 320 to accommodate the angle Ψ while maintaining the desired center-to-center dimension 321 (e.g., 6-inch center-to-center). The change in spacing is a trigonometric calculation of the desired dimension base on angle Ψ. In one example, as shown, is about 45 degrees allowing the tubing spacing coming into angled deflection fixture 300 to depart from angled deflection fixture 300 with about the same spacing. In other embodiments, the angle Ψ may be greater than 45 degrees such that tubing 10 entering the angled deflection fixture 300 (e.g. the horizontal portion shown) has a greater spacing between one another than the tubing exiting the fixture (e.g. the vertical portion shown). In other embodiments, the angle Ψ may be less than 45 degrees such that tubing 10 entering the angled deflection fixture 300 (e.g. the horizontal portion shown) has a smaller spacing between one another than the tubing exiting the angled deflection fixture 300 (e.g. the vertical portion shown).

In accordance with various embodiments, the guide elements 320 include suitable structures to redirect the direction of the tubing 10. For example, the guide elements can hold or direct the tubing 10 such that tubing 10 generally follows the deflection regions 310 allowing the tubing 10 to form a bend or loop around the deflection regions 310. In one example, guide element 320 is a protrusion that is located adjacent to deflection regions 310 such that when the tube is routed between the guide element 320 and the deflection regions 310, the guide element 320 overcomes the tendency of the tube 10 to straighten out or flex away from deflection regions 310. The guide elements 320 may be positioned such that as the tube 10 feeds into and departs from deflection regions 310, the tube 10 contacts the guide elements 320 and the deflection region 310. In one example, two guide elements 322, 324 are positioned such that the tube 10 passes between the guide elements 324 as it feeds into and exits from the deflection regions 310. In accordance with various embodiments, each deflection regions 310 on the angled deflection fixture 300 can have an entry guide element 324*a*, 324*c*, 324*e*, 324*h*, 324*j*, 324*l*, and an exit guide element 324*b*, 324*d*, 324*f*, 324*i*, 324*k*, 324*m*. In accordance with one example, as illustrated in FIGS. 3A-C, the guide elements 320 are defined by studs or protrusions. The protrusions are positioned such that the tube 5 enters and exits the deflection regions 310 at generally an orthogonal angle/direction. In other examples, the guide elements may restrain the tube 10 with a pair of elements on each portion of the tube 10 feeding into and exiting from the deflection regions 310. For example, entry guide element could include a pair of studs and the exit guide element could include a pair of studs, with each pair of studs separated from each other by approximately the outside diameter of the tube 10. Other structures for the guide elements 320 are also contemplated including, without limitation, clamps, brackets, straps, or other forms suitable to retain and/or direct the path of tube 10.

In various embodiments, the support structure 301 is configured to position the various features of the angled deflection fixture 300 relative to one another. In accordance with various embodiments, the support structure 301 includes suitable structure to support the deflection regions 310 or the guide element 320. In various embodiments, the support structure 301 includes suitable structure to maintain the position of deflection regions 310 relative to the guide element 320. In accordance with various embodiments, the support structure 301 includes surfaces 302 and 303. In various embodiments, the support structure 301 can be a single contiguous structure or multiple related structures. For example, a portion of the support structure 301 can mount the guide elements 320 (e.g., from surface 302). A different portion of the support structure 301 can mount the deflection regions 310 (e.g., from surface 303). In various embodiments, the one or more deflection regions 310 and/or the one or more guide elements 320 extend from the surfaces and/or are located relative to each other via the surface. In various embodiments, the support structure 301 includes one or more supports 304, 306 configured to set a surface height of the surface 302. These supports 304, 306 can be walls, standoff, studs, a contiguous body with surfaces 302 and/or 303, or other features suitable to engage with the surface or construction material on which the fixture rests.

In accordance with various embodiments, the connectors 340 include suitable elements to constrain one angled deflection fixture 300 relative to an adjacent fixture or portions of the same fixture, such as for example, separate parts body 305 to body 370 or 380. The separate parts may allow for easier removal. For example, body 370 and 380 can be disconnected from body 305 and rotated sideways. In this way, body 370 and 380 can support the tubing above body 305 which can be pulled out easily. Then body 370 and 380 can be pulled out like body 305

The connector 340 can include any bracket, clamp, clip, anchor, hook, or feature suitable to constrain one side of angled deflection fixture 300 to an adjacent structure such as another fixture 300. In various examples, the connector 340 can extend from one side of the angled deflection fixture 300 or from an internal component wall such that an adjacent connector can be engaged. In a particular example, one side of support structure 305 includes a downwardly or upwardly facing hook 316. An opposing side of the support structure 305 can include a downwardly or upwardly facing hook 314. A second component of structure 301 or another fixture can have the opposing downwardly or upwardly facing hook 342. Thus, when two angled deflection fixtures 300 are placed side by side the hooks can engage securing one angled deflection fixture 300 to the other similar. These structures can include further similar details discussed above with regard to angled deflection fixture 300. In other embodiments, one angled deflection fixture 300 can be connected to an adjacent fixture via fasteners (such as clamps, screw, bolts, straps, or other hardware). In other embodiments, adjacent fixtures can be positioned freely of one another.

In accordance with various embodiments, the anchor 330 include suitable elements to constrain the angled deflection fixture 300 relative to the underlying structure such as the construction material, subfloor, wire mesh, ground, or similar structure. The anchor 330 can include any bracket, clamp, anchor, hook, clip, fastener, stake, or other feature suitable to generally constrain the angled deflection fixture 300 in place during installation of the tubing 10. As tubing 10 is installed around the various fixtures, tension is placed on tubing 10 such that it forms generally straight paths. In the absence of an anchor 330, the angled deflection fixture 300 would move thus frustrating its purpose. By anchoring angled deflection fixture 300 in place, tension can be placed on the tubing 10 allowing for an improved installation. In various embodiments, the angled deflection fixture 300 can include multiple anchors 334, 336. For example, each end of the fixture 300 can have an anchor 330 limiting torque on the angled deflection fixture 300 when tension is placed on the tubing 10 during installation. In one example, the anchors 330 include apertures 334, 336 that receive a fastener 333 that can be driven down into the subfloor or ground thereby constraining the angled deflection fixture 300 to its location.

The various components described in FIGS. 3A-C are merely examples and other variations, including eliminating components, combining components, and substituting components are all contemplated.

Figure 4A:
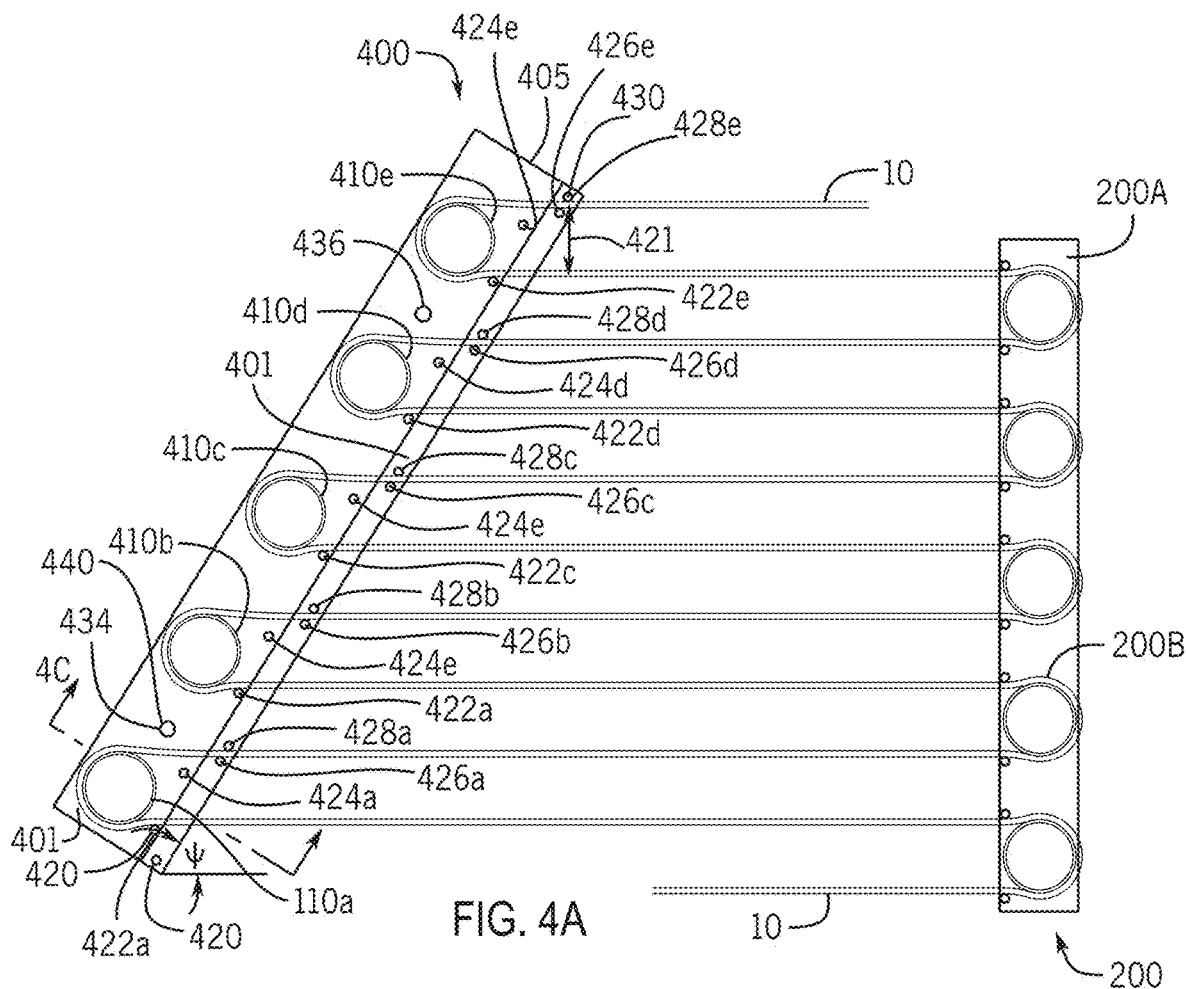
FIG. 4A-C are illustrations of an angled end loop fixture from top, side, and end view respectively in accordance with at least some embodiments provided herein.
Figure 4B:
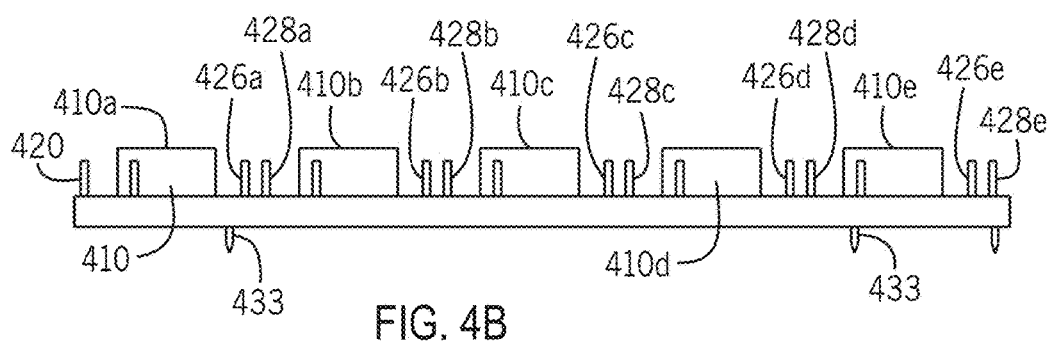
Figure 4C:
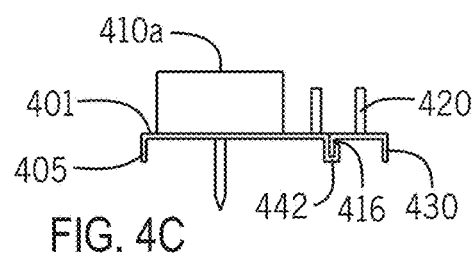

FIGS. 4A-C are illustrations of the angled end loop fixture 400, arranged in accordance with at least some embodiments described herein. FIGS. 4A-C show examples of the angled end loop fixture 400 having multiple turns. It is appreciated however, that this is merely an example of an angled end loop fixture 400 and that the angled end loop fixture 400 can have any number of deflection regions such as 1 region, 2 regions, 3 regions, 4 regions, 5 regions, (as illustrated in FIG. 4A), or greater. In accordance with various embodiments, an angled end loop fixture 400 can include one or more deflection regions 410 configured to define the radius or curvature of the tubing 10 around the region. In various embodiments, the deflection region is a turn suitable to form a 180° deflection in the overall path of the tubing 10 such that adjacent spans are parallel to one another. In accordance with various embodiments, the angled end loop fixture 400 can include one or more guide elements 420 configured to position the tubing 10 around the deflection region 410 and/or establish the center-to-center distance of one portion of tubing 10 relative to the adjacent portion of tubing 10. In accordance with various embodiments, an angled end loop fixture 400 can include one or more connectors 440 configured for connecting the angled end loop fixture 400 to an adjacent fixture or for connecting portions of the angled end loop fixture 400 to itself. In accordance with various embodiments, an angled end loop fixture 400 can include one or more support structures 401 configured to support the deflection regions 410 and/or the guide elements 420 relative to one another. In accordance with various embodiments, the angled end loop fixture 400 can include one or more anchors 440 configured to anchor the angled end loop fixture 400 to the desired location on the construction surface.

In accordance with various embodiments, the deflection regions 410 include suitable structure to define a minimum radius of the tubing 10. In a preferred embodiment, the deflection regions 410 include an exterior surface that contacts the tubing 10. However, in other embodiments, the deflection regions 410 are discontinuous structures such as multiple studs that define a radius or a portion of a radius to route the tubing 10 around. In embodiments, in which the deflection regions 410 includes an exterior surface, the surface may be a portion of a cylinder (e.g. less than a full cylinder such as a half cylinder or less), but in alternative examples, the surface is fully cylindrical. The deflection regions 410 have a height that is sufficient to retain the tubing 10 during a layout process while the tubing 10 is extended from fixture to fixture. However, the height is also sufficiently small to allow the angled end loop fixture 400 to be pulled out from under the tubing 10 after the tubing is properly secured to the construction material. As illustrated by way of example in FIGS. 4A-C, the deflection regions 410 are formed by a sheet metal cylinder, but as discussed in more detail below, the deflection regions 410 can be formed from other materials or processes. As illustrated by way of example in FIGS. 4A-C, the angled end loop fixture 400 includes deflection regions 410*a-e*. However, as discussed above, it is to be appreciated that fewer or more regions can be provided as part of a single angled end loop fixture 400. Other structures for the deflection regions 410 are also contemplated herein including, without limitation, clamps, brackets, straps, mandrels, stakes, or other forms suitable to retain and/or direct the path of tube 10.

In accordance with various embodiments, the guide elements 420 include suitable structure to redirect the direction of the tubing 10. For example, the guide elements can hold or direct the tubing 10 such that tubing 10 generally follows the deflection regions 410 allowing the tubing 10 to form a bend or loop around the deflection regions 410. In one example, guide element 420 is a protrusion that is located adjacent to deflection regions 410 such that, when the tube is routed between the guide element 420 and the deflection regions 410, the guide element 420 overcomes the tendency of the tube 10 to straighten out or flex away from deflection regions 410. The guide elements 420 may be positioned such that, as the tube 10 feeds into and departs from deflection regions 410, the tube 10 contacts the guide elements 420 and the deflection region 410. As shown in the FIG. 4A, multiple different locations and orientations of guide elements 420 are provided. These multiple different locations and orientations allow different components to be utilized in different applications. As shown, the angled end loop fixture 400 includes an adapter 430 that supports guide elements 426*a-e* and 428*a-e*. While shown as different components, these can also be provided as a contiguous device. The support guide elements 426*a-e* and 428*a-e* can be positioned to retain the desired center-to-center dimension 421 of the tube 10 even when angled end loop fixture 400 is positioned at angle Ψ relative to the direction of the tube 10 extending therefrom. While any angle can be provided for by adjusting the spacing between the deflection region 410 and the guide elements 426*a-e* and 428*a-e* to accommodate the angle Ψ while maintaining the desired center-to-center dimension 421 (e.g., 6-inch center-to-center). The change is spacing is a trigonometric calculation of the desired dimension base on angle Ψ. Similar to other fixtures discussed above, the structure 405 can also support guide element 422*a-e* and 424*a-e* positioned adjacent to deflection region 410. In accordance with one example, as illustrated in FIGS. 4A-C, the guide elements 420 are defined by studs or protrusions. The guide elements may restrain the tube 10 with a pair of elements on each portion of the tube 10 feeding into and exiting from the deflection regions 410 as shown with guide elements 426*a-e* and 428*a-e*. For example, entry guide element could include a pair of studs and the exit guide element could include a pair of studs, with each pair of studs separated from each other by approximately the outside diameter of the tube 10. Other structures for the guide elements 420 are also contemplated including, without limitation, clamps, brackets, straps, or other forms suitable to retain and/or direct the path of tube 10.

In accordance with various embodiments, the tubing guide element 422 and the tubing guide elements 426 and 428 are positioned with respect to the deflection region 410 such that an association between the first tubing guide element 422, the second tubing guide elements 426 and 428, and the deflection region 410 is configured to direct the tubing 10 away from the deflection region 410 on each side thereof and between the first tubing guide element 422 and second tubing guide elements 426 and 428. In accordance with some embodiments, the distance 421 between the first tubing guide element 422 and the further of the second tubing guide elements 428 is less than the diameter of the deflection region 410 plus two times diameter of the tubing 10. In accordance with some embodiments, the distance 421 between the first tubing guide element 422 and the further of the second tubing guide elements 428 is less than the diameter of the deflection region 410. In accordance with some embodiments, the distance 421 between the first tubing guide element 422 and the further of the second tubing guide elements 428 is greater than the diameter of the deflection region 410, but less than the diameter of the deflection region 410 plus two times diameter of the tubing 10. In accordance with some embodiments, the distance 421 between the first tubing guide 422 and the further of the second tubing guide elements 428 is sufficiently small to cause the first and second tubing guides to deflect the tubing between ¼ and ⅛ of an inch less than the diameter of the deflection region. In accordance with various embodiments, distance 421 and distance 221 are approximately the same as shown for example in FIG. 4A.

In accordance with various embodiments with the angled end loop fixture 400 having a plurality of deflection regions 410, angle Ψ can be any angle between 15° and 165°. In embodiments, with the angled end loop fixture 400 having an angle Ψ approximately 90°, then fixture 200 and fixture 400 have substantially similar or identical configurations. The angled end loop fixture 400 includes an angle between 20° and 40° or between 50° and 70°. In a more particular example, the angled end loop fixture 400 includes an angle of approximately 30° or 60°. In one example, as shown in FIG. 4A angle Ψ is approximately 60°. The angled end loop fixture 400 can be configured to adapt to the architectural angles used in a buildings floor radiant heating layout particularly when radiant heating tubing includes turns at one end that terminate at a linear angle to one another.

In various embodiments, the support structure 401 is configured to position the various features of the angled end loop fixture 400 relative to one another. In accordance with various embodiments, the support structure 401 includes suitable structure to support the deflection regions 410 or the guide element 420. In various embodiments, the support structure 401 includes suitable structure to maintain the position of deflection regions 410 relative to the guide element 420. In various embodiments, the support structure 401 can be a single contiguous structure or multiple related structures (e.g., structure 405 and 430). For example, a portion of the support structure 401 can mount the guide elements 420 (e.g., from surface 402). In various embodiments, the one or more deflection regions 410 and/or the one or more guide elements 420 extend from the surfaces and/or are located relative to each other via the surface. Like other fixtures, the supports can be walls, standoff, studs, a contiguous body with surfaces, or other features suitable to engage with the surface or construction material on which the angled end loop fixture 400 rests.

In accordance with various embodiments, the connectors 440 include suitable elements to constrain one angled end loop fixture 400 relative to an adjacent fixture or portions of the same fixture such as body 405 to body 440. The connector 440 can include any bracket, clamp, clip, anchor, hook, or feature suitable to constrain one side of angled end loop fixture 400 to an adjacent structure such as another angled end loop fixture 400. In various examples, the connector 440 can extend from one side of the angled end loop fixture 400 or from an internal component wall such that an adjacent connector can be engaged. In a particular example, one side of support structure 405 includes a downwardly or upwardly facing hook 416. An opposing side of the support structure 405 can include a downwardly or upwardly facing hook 414. A second component of structure 401 or another fixture can have the opposing downwardly or upwardly facing hook 442. Thus, when two angled end loop fixtures 400 are placed side by side the hooks can engage securing one angled end loop fixture 400 to the other similar. These structures can include further similar details discussed above with regards to end loop fixture 200. In other embodiments, one angled end loop fixture 400 can be connected to an adjacent fixture via fasteners (such as clamps, screw, bolts, straps, or other hardware). In other embodiments, adjacent fixtures can be positioned freely of one another.

In accordance with various embodiments, the anchor 440 includes suitable elements to constrain the angled end loop fixture 400 relative to the underlying structure such as the construction material, subfloor, wire mesh, ground, or similar structure. The anchor 440 can include any bracket, clamp, anchor, hook, clip, fastener, stake, or other feature suitable to generally constrain the angled end loop fixture 400 in place during installation of the tubing 10. As tubing 10 is installed around the various fixtures, tension is placed on tubing 10 such that it forms generally straight paths. In the absence of an anchor 440, the angled end loop fixture 400 would move thus frustrating its purpose. By anchoring angled end loop fixture 400 in place, tension can be placed on the tubing 10 allowing for an improved installation. In various embodiments, the angled end loop fixture 400 can include multiple anchors 434, 436. For example, each end of the angled end loop fixture 400 can have an anchor 430 limiting torque on the angled end loop fixture 400 when tension is placed on the tubing 10 during installation. In one example, the anchors 440 include apertures 434, 436 that receive a fastener 433 that can be driven down into the subfloor or ground thereby constraining the angled end loop fixture 400 to its location.

The various components described in FIGS. 4A-C are merely examples and other variations, including eliminating components, combining components, and substituting components are all contemplated.

Figure 5A:
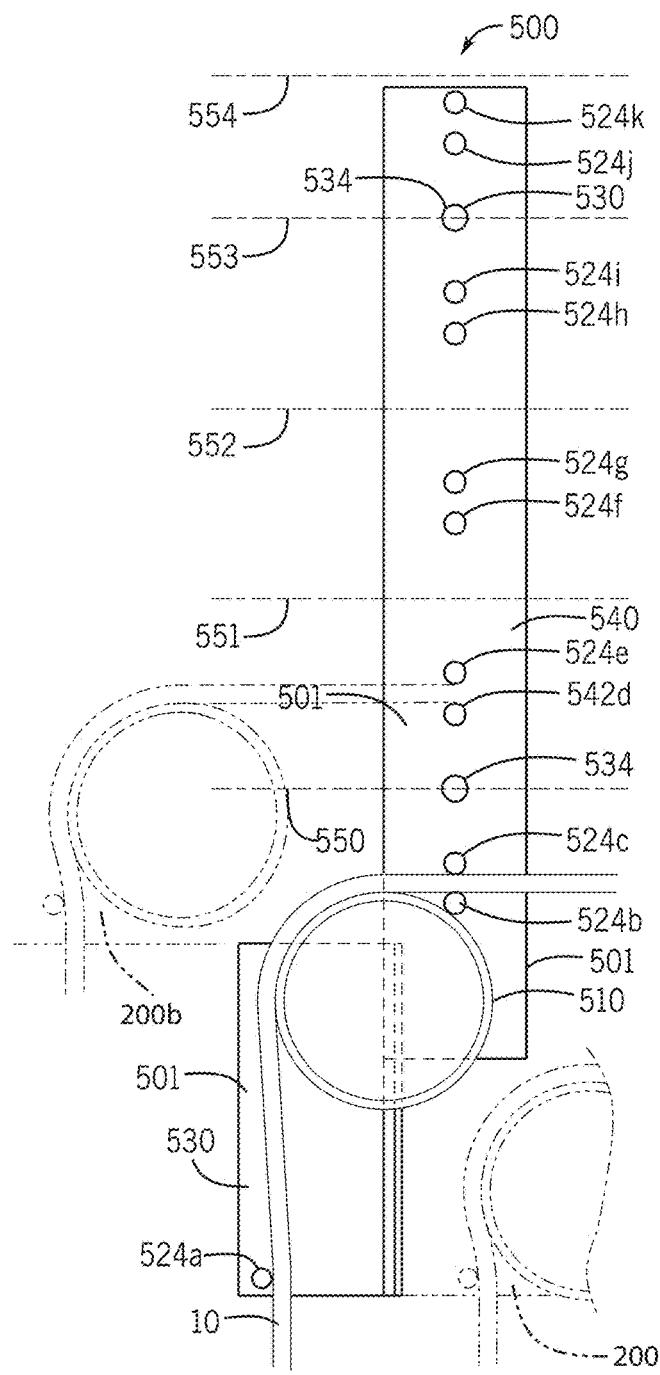
FIG. 5A-D are illustrations of a staggered deflection fixture from top (left FIG. 5B and right FIG. 5A mirror images), front (FIG. 5C), and rear (FIG. 5D) end views of FIG. 5B in accordance with at least some embodiments provided herein.
Figure 5B:
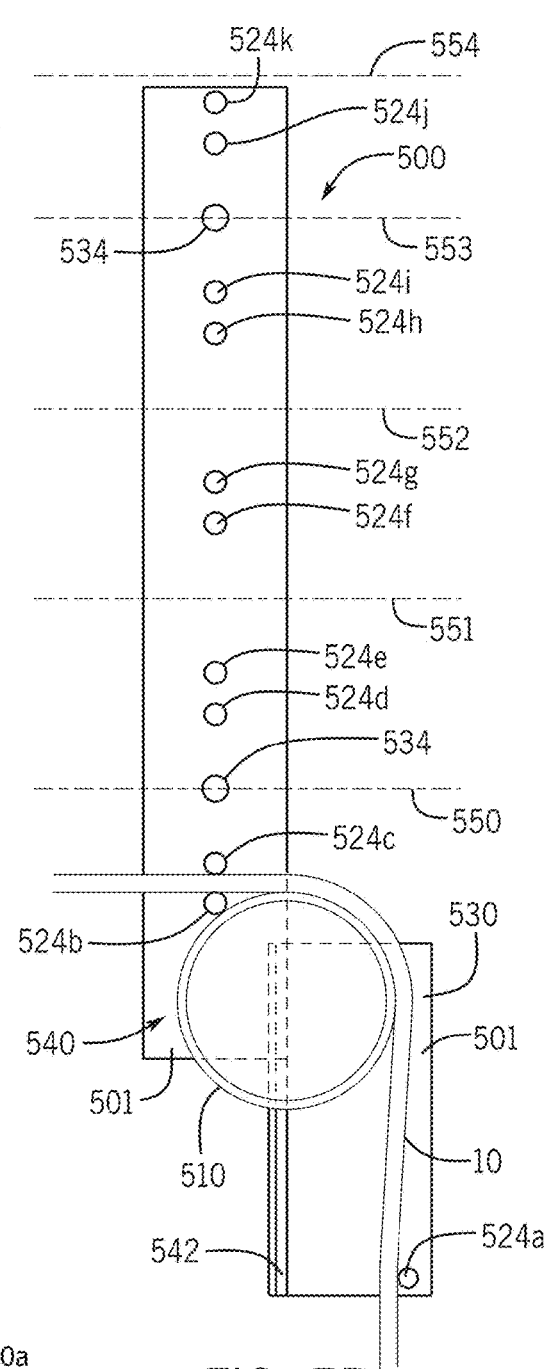
Figure 5D:
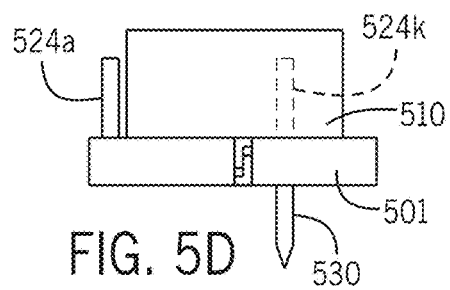
Figure 5C:
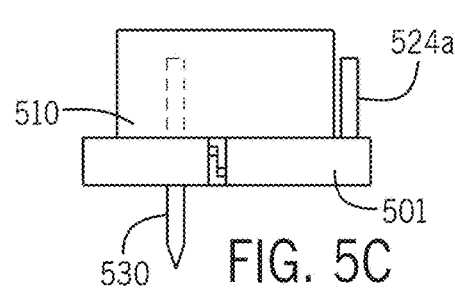

FIGS. 5A-D are illustrations of the staggered bend fixture 500, arranged in accordance with at least some embodiments described herein. FIG. 5A illustrates a right hand bend fixture while FIGS. 5B-D are the mirror image of the same illustrating left hand bend fixtures. While shown with a single deflection region 510, it is appreciated however, that this is merely an example of a staggered bend fixture 500 and that the staggered bend fixture 500 can have any number of deflection regions. In accordance with various embodiments, a staggered bend fixture 500 can include one or more deflection regions 510 configured to define the radius or curvature of the tubing 10 around the region. In various embodiments, the deflection region is a turn suitable to form a 90° deflection in the overall path of the tubing 10 such that the tubing 10 changes direction. Other angles are contemplated as well and the fixture can be configured to suit the application overall. In accordance with various embodiments, the staggered bend fixture 500 can include one or more guide elements 520 configured to position the tubing 10 around the deflection region 510. In accordance with various embodiments, a staggered bend fixture 500 can include one or more connectors 540 configured for connecting the staggered bend fixture 500 to an adjacent fixture or for connecting portions of the staggered bend fixture 500 to itself. In accordance with various embodiments, a staggered bend fixture 500 can include one or more support structures 501 configured to support the deflection regions 510 and/or the guide elements 520 relative to one another. In accordance with various embodiments, a staggered bend fixture 500 can include one or more anchors 540 configured to anchor the staggered bend fixture 500 to the desired location on the construction surface. In accordance with various embodiments, a staggered bend fixture 500 can include an intermediate guide fixture configured to maintain a center-to-center distances of other runs of tubing 10.

In accordance with various embodiments, the deflection regions 510 include suitable structure to define a minimum radius of the tubing 10. In a preferred embodiment, the deflection regions 510 include an exterior surface that contacts the tubing 10. However, in other embodiments, the deflection regions 510 is a discontinuous structure such as a multiple studs that define a radius or a portion of a radius to route the tubing 10 around. In embodiments, in which the deflection regions 510 includes an exterior surface, the surface may be a portion of a cylinder (e.g. less than a full cylinder such as a half cylinder or less), but in alternative examples, the surface is fully cylindrical. The deflection regions 510 have a height that is sufficient to retain the tubing 10 during a layout process while the tubing 10 is extended from fixture to fixture. However, the height is also sufficiently small to allow the staggered bend fixture 500 to be pulled out from under the tubing 10 after the tubing is properly secured to the construction material. As illustrated by way of example in FIGS. 5A-D, the deflection regions 510 is formed by a sheet metal cylinder but, as discussed in more detail below, the deflection regions 510 can be formed from other materials or processes. Other structures for the deflection regions 510 are also contemplated herein including, without limitation, clamps, brackets, straps, mandrels, stakes, or other forms suitable to retain and/or direct the path of tube 10.

In accordance with various embodiments, the guide elements 520 include suitable structure to redirect the direction of the tubing 10. For example, the guide elements can hold or direct the tubing 10 such that tubing 10 generally follows the deflection regions 510 allowing the tubing 10 to form a bend or loop around the deflection regions 510. In one example, guide element 520 is a protrusion that is located adjacent to deflection regions 510 such that, when the tube is routed between the guide element 520 and the deflection regions 510, the guide element 520 overcomes the tendency of the tube 10 to straighten out or flex away from deflection regions 510. The guide elements 520 may be positioned such that, as the tube 10 feeds into and departs from deflection regions 510, the tube 10 contacts the guide elements 520 and the deflection region 510. As shown in the FIGS. 5A and B, multiple different locations and orientations of guide elements 520 are provided. Some guide elements 520 (e.g. 524a, 524b, and 524c) aid the tubing 10 being deflected by region 510. In various embodiments, other guide elements 520 (e.g. 524d-524k) are configured to hold the center-to-center position of runs of other tubing passing within the center-to-center distance of the deflection region 510. These other guide elements 524d-524k define the intermediate guide element portion of the staggered bend fixture 500. While shown with four additional runs, it is understood that more intermediate guide elements for more additional runs can be incorporated or alternatively fewer intermediate guide elements for fewer additional runs is also contemplated.

In various embodiments, the support structure 501 is configured to position the various features of the staggered bend fixture 500 relative to one another. In accordance with various embodiments, the support structure 501 includes suitable structure to support the deflection regions 510 or the guide element 520. In various embodiments, the support structure 501 includes suitable structure to maintain the position of deflection regions 510 relative to the guide element 520. In various embodiments, the support structure 501 can be a single contiguous structure or multiple related structures. For example, a portion of the support structure 501 can mount the guide elements 520 (e.g., from surface 502). In various embodiments, the one or more deflection regions 510 and/or the one or more guide elements 520 extend from the surfaces and/or are located relative to each other via the surface. Like other fixtures the supports can include walls, standoff, studs, a contiguous body with surfaces, or other features suitable to engage with the surface or construction material on which the fixture rests.

In accordance with various embodiments, the connectors 540 include suitable elements to constrain one staggered bend fixture 500 relative to an adjacent fixture or portions of the same fixture. The connector 540 can include any bracket, clamp, clip, anchor, hook, or feature suitable to constrain one side of staggered bend fixture 500 to an adjacent structure such as another staggered bend fixture 500. In various embodiments, the connectors can be similar to the connectors of other fixtures and embodiments discussed herein. In various embodiments, staggered bend fixture 500 can be connected to an adjacent fixture via fasteners (such as clamps, screw, bolts, straps, or other hardware). In other embodiments, adjacent fixtures can be positioned freely of one another.

In accordance with various embodiments, the anchor 530 include suitable elements to constrain the staggered bend fixture 500 relative to the underlying structure such as the construction material, subfloor, wire mesh, ground, or similar structure. The anchor 540 can include any bracket, clamp, anchor, hook, clip, fastener, stake, or other feature suitable to generally constrain the staggered bend fixture 500 in place during installation of the tubing 10. The anchor can be structure similar to the anchors of other fixtures or embodiments discussed herein.

In accordance with various embodiments, the staggered bend fixture 500 can nest between adjacent fixtures such as fixtures 200a and 200b shown in FIG. 5A. The staggered bend fixture 500 is positioned to stagger the two fixtures relative to one another such that different runs of tubing 10 can be laid out and staggered bend fixture 500 can form a bend in the tubing to send it on a home run back to the control unit 50 as shown in FIG. 1. Staggered bend fixture 500 can also constrain addition runs of tubing at the desired center-to-center dimension. As shown, the additional runs are positioned for example between guides 524d and 524e in a first span 551, 524f and 524g is a second span 552, 524h and 524i in a third span 553, 524j and 524k in a fourth span 554. In other embodiments, fewer spans can be present. For example, no additional spans are present with the bracket terminating at 550. For example, 1 additional span is present with the bracket terminating at 551. For example, two additional spans are present with the bracket terminating at 551. For example, three additional spans are present with the bracket terminating at 553. In other embodiments, the staggered bend fixture 500 can extend beyond 554 with more spans than 4.

The various components described in FIGS. 5A-D are merely examples and other variations, including eliminating components, combining components, and substituting components are all contemplated.

FIGS. 6A-D are illustrations of the partial span end loop fixtures 600, arranged in accordance with at least some embodiments described herein. While a single deflection region 610 can be utilized, it is appreciated that the partial span end loop fixture 600 can have any number of deflection regions such as two, three, four, or more than for. While each partial span end loop fixture 600 is shown with a pair of deflection regions 610, it is noted that, benefits occur from pairing two partial span end loop fixtures 600 together utilizing four deflection regions 610. For example, this enables tubing 10 to jog around adjacent looped ends of tubing 10 that occur on deflection regions 610a on each of the pair of partial span end loop fixtures 600. In some embodiments, the pair of partial span end loop fixtures 600 shown together in FIG. 6C may be formed as a single contiguous fixture. Consistent with other fixtures and embodiments, the deflection regions 610 are configured to define the radius or curvature of the tubing 10 around the deflection region. In various embodiments, the deflection region 610a defines a turn suitable to form a 180° loop in the tubing 10. Other angles are contemplated as well. For example, the deflection regions 610b define bends of about 90°. It is appreciated that the combination guide elements 620 and deflection regions 610 can be configured to suit other applications and other deflections angles as is required for the individual application. In accordance with various embodiments, the partial span end loop fixture 600 can include one or more guide elements 620 configured to position the tubing 10 around the deflection region 610. In accordance with various embodiments, a partial span end loop fixture 600 can include one or more connectors 640 configured for connecting the partial span end loop fixture 600 to an adjacent fixture or for connecting portions of the partial span end loop fixture 600 to itself. In accordance with various embodiments, a partial span end loop fixture 600 can include one or more support structures 601 configured to support the deflection regions 610 and/or the guide elements 620 relative to one another. In accordance with various embodiments, a partial span end loop fixture 600 can include one or more anchors 630 configured to anchor the partial span end loop fixture 600 to the desired location on the construction surface.

In accordance with various embodiments, the deflection regions 610 include suitable structure to define a minimum radius of the tubing 10. In a preferred embodiment, the deflection regions 610 include an exterior surface that contacts the tubing 10. However, in other embodiments, the deflection region 610 is a discontinuous structure such as multiple studs that define a radius or a portion of a radius to route the tubing 10 around. In embodiments, in which the deflection regions 610 includes an exterior surface, the surface may be a portion of a cylinder (e.g. less than a full cylinder such as a half cylinder or less), but in alternative examples, the surface is fully cylindrical. The deflection regions 610 have a height that is sufficient to retain the tubing 10 during a layout process while the tubing 10 is extended from fixture to fixture. However, the height is also sufficiently small to allow the partial span end loop fixtures 600 to be pulled out from under the tubing 10 after the tubing is properly secured to the construction material. As illustrated by way of example in FIGS. 6A-D, the deflection regions 610 are formed by a sheet metal cylinder but as discussed in more detail below the deflection regions 610 can be formed from other materials or processes. Other structures for the deflection regions 610 are also contemplated herein including, without limitation, clamps, brackets, straps, mandrels, stakes, or other forms suitable to retain and/or direct the path of tubing 10.

In accordance with various embodiments, the guide elements 620 include suitable structure to redirect the direction of the tubing 10. For example, the guide elements 620 can hold or direct the tubing 10 such that tubing 10 generally follows the deflection regions 610, allowing the tubing 10 to form a bend or loop around the deflection regions 610. In one example, guide element 620 is a protrusion that is located adjacent to deflection regions 610 such that, when the tube is routed between the guide element 620 and the deflection regions 610, the guide element 620 overcomes the tendency of the tube 10 to straighten out or flex away from deflection regions 610. The guide elements 620 may be positioned such that as the tubing 10 feeds into and departs from deflection regions 610, the tubing 10 contacts the guide elements 620 and the deflection regions 610. As shown in the FIGS. 6A-C, multiple different locations and orientations of guide elements 620 are provided. Some guide elements 620 (e.g. 622a, 624a) aid the tubing 10 being deflected by deflection region 610a. In various embodiments, other guide elements 620 (e.g. 624b) aid the tubing 10 being deflected by deflection region 610b. Additionally, these tubes around the deflection regions 610b and 610a can be different runs of tube 10 as illustrated in FIG. 1.

In various embodiments, the support structure 601 is configured to position the various features of the partial span end loop fixtures 600 relative to one another. In accordance with various embodiments, the support structure 601 includes suitable structure to support the deflection regions 610 or the guide element 620. In various embodiments, the support structure 601 includes suitable structure to maintain the position of deflection regions 610 relative to the guide element 620. In various embodiments, the support structure 601 can be a single contiguous structure or multiple related structures. For example, a portion of the support structure 601 can mount the guide elements 620 (e.g., from surface 602). In various embodiments, the one or more deflection regions 610 and/or the one or more guide elements 620 extend from the surfaces and/or are located relative to each other via the surface. Like other fixtures, the supports can include walls, standoffs, studs, a contiguous body with surfaces, or other features suitable to engage with the surface or construction material on which the fixture rests.

In accordance with various embodiments, the connectors 640 include suitable elements to constrain one partial span end loop fixture 600 relative to an adjacent fixture or portions of the same fixture. The connector 640 can include any bracket, clamp, clip, anchor, hook, or feature suitable to constrain one side of partial span end loop fixture 600 to an adjacent structure such as another fixture 600. In various embodiments, the connectors can be similar to the connectors of other fixtures and embodiments discussed herein. In various embodiments, partial span end loop fixture 600 can be connected to an adjacent fixture via fasteners (such as clamps, screw, bolts, straps, or other hardware). In other embodiments, adjacent fixtures can be positioned freely of one another.

In accordance with various embodiments, the anchor 630 includes suitable elements to constrain the partial span end loop fixture 600 relative to the underlying structure, such as the construction material, subfloor, wire mesh, ground, or similar structure. The anchor 630 can include any bracket, clamp, anchor, hook, clip, fastener, stake, or other feature suitable to generally constrain the partial span end loop fixture 600 in place during installation of the tubing 10. The anchor can be structure similar to the anchors of other fixtures or embodiments discussed herein.

The various components described in FIGS. 6A-D are merely examples and other variations, including eliminating components, combining components, and substituting components are all contemplated.

Figure 7A:
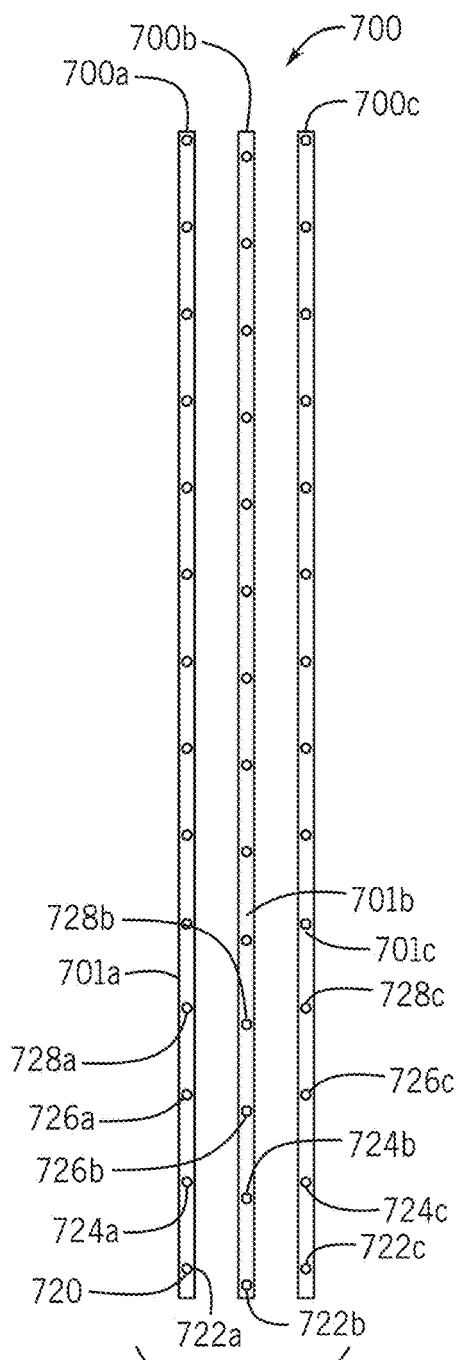
FIG. 7A-C are illustrations of an intermediate guide from top separated (FIG. 7A), top joined (FIG. 7B), and an end view joined (FIG. 7C) in accordance with at least some embodiments provided herein.
Figure 7B:
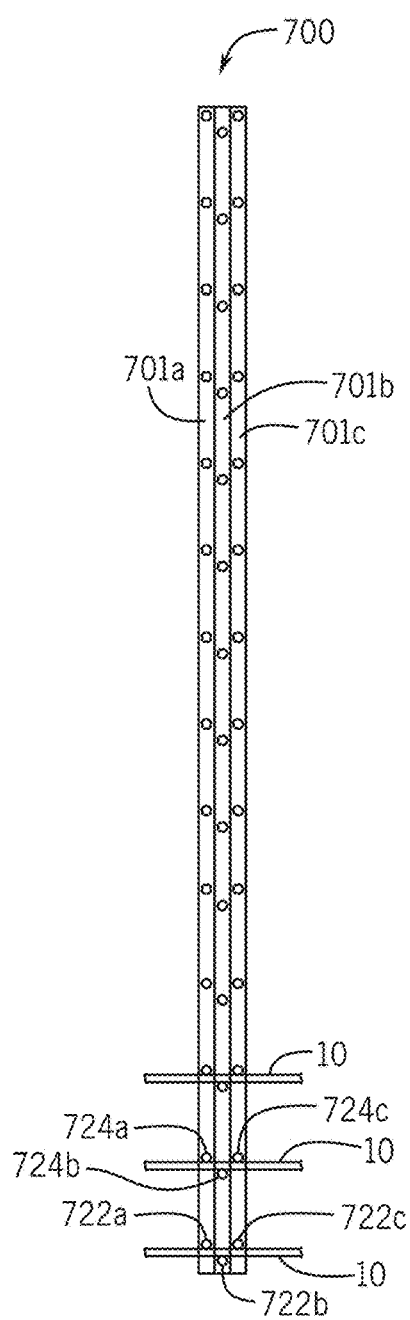
Figure 7C:
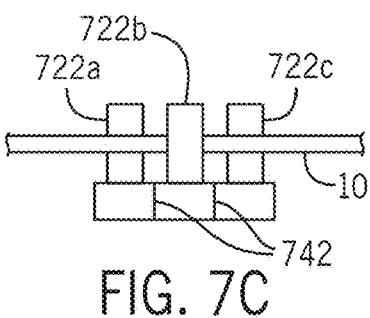

FIGS. 7A-C are illustrations of the intermediate guide element 700, arranged in accordance with at least some embodiments described herein. In various embodiments, the intermediate guide element 700 includes guide elements 720 extending along a support structure 701. The support structure 701 can include separate bodies 701a, 701b, and 701c. Along these bodies, the guide elements 720 can be configured to hold the tubing 10 in place and more particularly they are configured to hold the center-to-center position of runs of other tubing extending across long spans between fixtures or the manifold 50 as shown in FIG. 1. Each of the bodies 701a, 701b, and 701c can include a plurality of elements each. For example, body 701a includes guides 722a, 724a, 726a, 728a . . . etc.; body 701b includes guides 722b, 724b, 726b, 728b . . . etc.; and body 701c includes guides 722c, 724c, 726c, 728c . . . etc. Adjacent guides (e.g. 722a, 722b, and 722c) can define tubing paths sized to receive and retain tubing 10 there between. This can be done by longitudinally offsetting the adjacent guides to form a gap therein. In other embodiments, an intermediate guide can be formed on a single body with pairs of guides such as shown in FIG. 4A via structure 430. While shown with fourteen different tubing 10 paths in FIGS. 7A and 7B, it is understood that more additional paths can be incorporated or alternatively fewer paths are also contemplated.

In accordance with various embodiments, the intermediate guide element 700 can include an anchor suitable to constrain the fixture relative to the underlying structure, such as the construction material, subfloor, wire mesh, ground, or similar structure. The anchor can include any bracket, clamp, anchor, hook, clip, fastener, stake, or other features suitable to generally constrain the fixture in place during installation of the tubing 10. The anchor can be structured similar to the anchors of other fixtures or embodiments discussed herein.

In accordance with various embodiments, the intermediate guide element 700 can include connectors 742. Connectors 742 include suitable elements to constrain one fixture relative to an adjacent fixture or portions of the same fixture, e.g. bodies 701a, 701b, and/or 701c. The connectors 742 can include any bracket, clamp, clip, anchor, hook, or feature suitable to constrain one side of fixture to an adjacent structure. In various embodiments, the connectors can be similar to the connectors of other fixtures and embodiments discussed herein. In various embodiments, fixture or portions thereof can be connected to an adjacent structure via fasteners (such as clamps, screw, bolts, straps, or other hardware). In other embodiments, adjacent fixtures can be positioned freely of one another.

The various fixtures 200-600, embodiments, aspects, or examples discussed herein can be manufactured out any suitable material including metal, polymers, wood, or composites of any suitable materials. Additionally, the various fixtures 200-600, embodiments, aspects, or examples discussed herein can manufacture via any suitable process including machine, forming, stamping forging, welding, casting, molding, additive fabrication, etc. In accordance with various embodiments, as illustrated, the various fixtures 200-600, embodiments, aspects, or examples discussed herein are manufactured via sheet metal forming and welding techniques.

Figure 8:
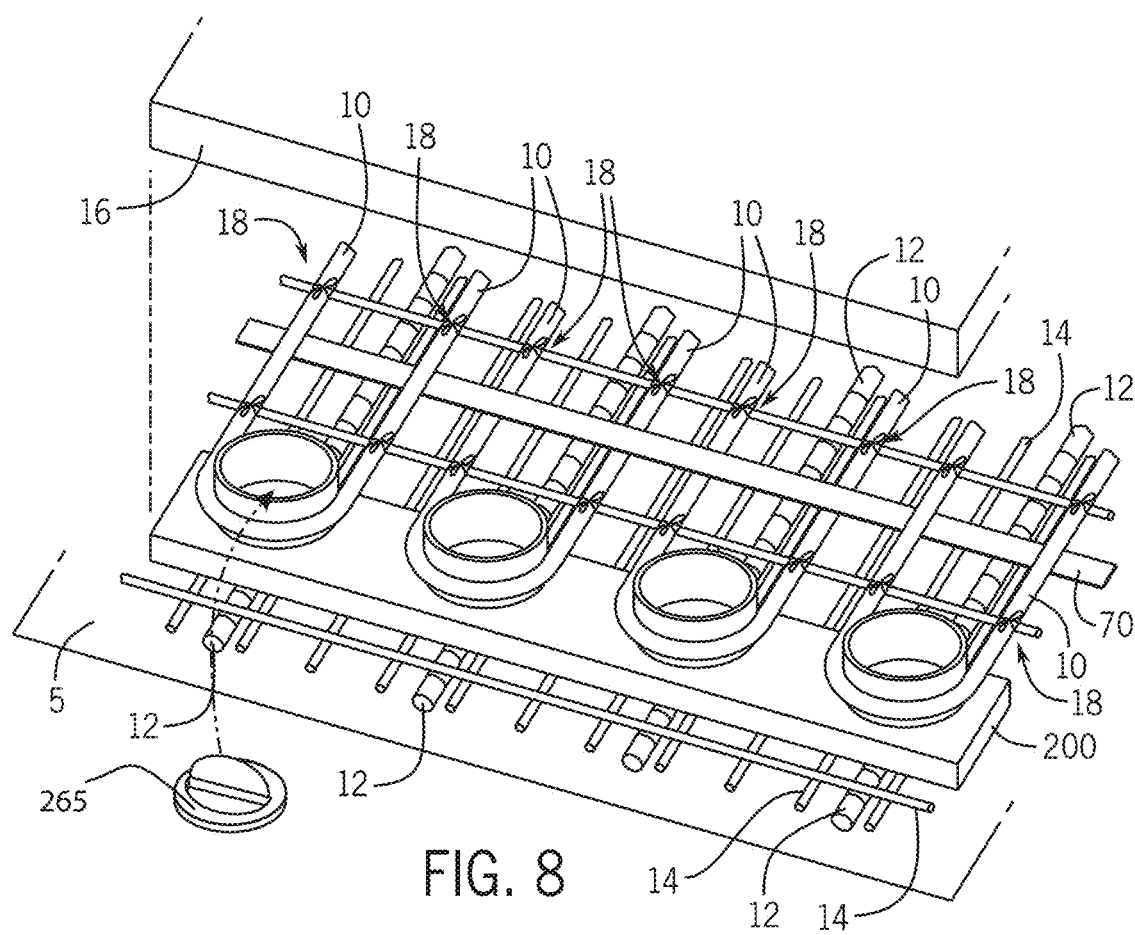
FIG. 8 is an isometric schematic illustration of the components of a floor structure with a fixture and tubing positioned thereon in accordance with at least some embodiments provided herein.
Figure 9A:
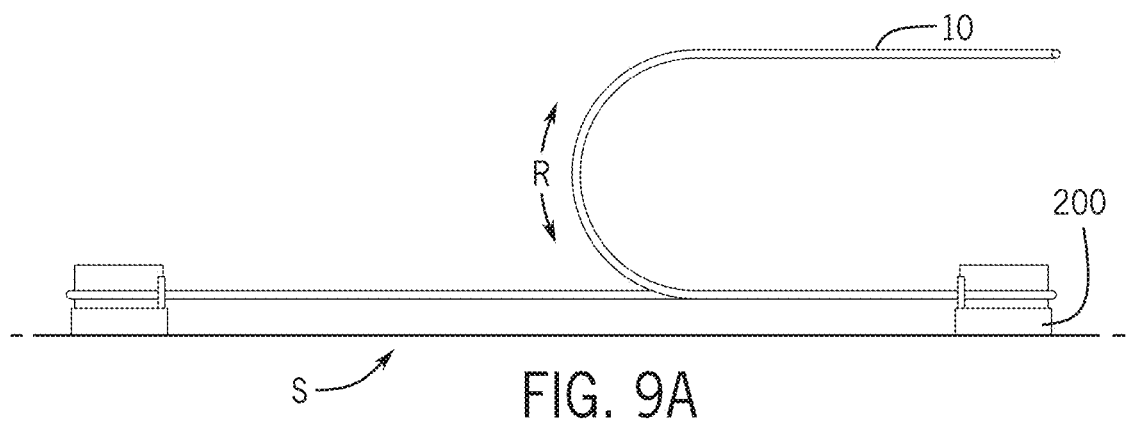
FIG. 9A is an end view of a schematic illustration of central spans of tubing being pulled off of a fixture to weave a post tensioning cable above and below the tubing in accordance with at least some embodiments provided herein.
Figure 9B:
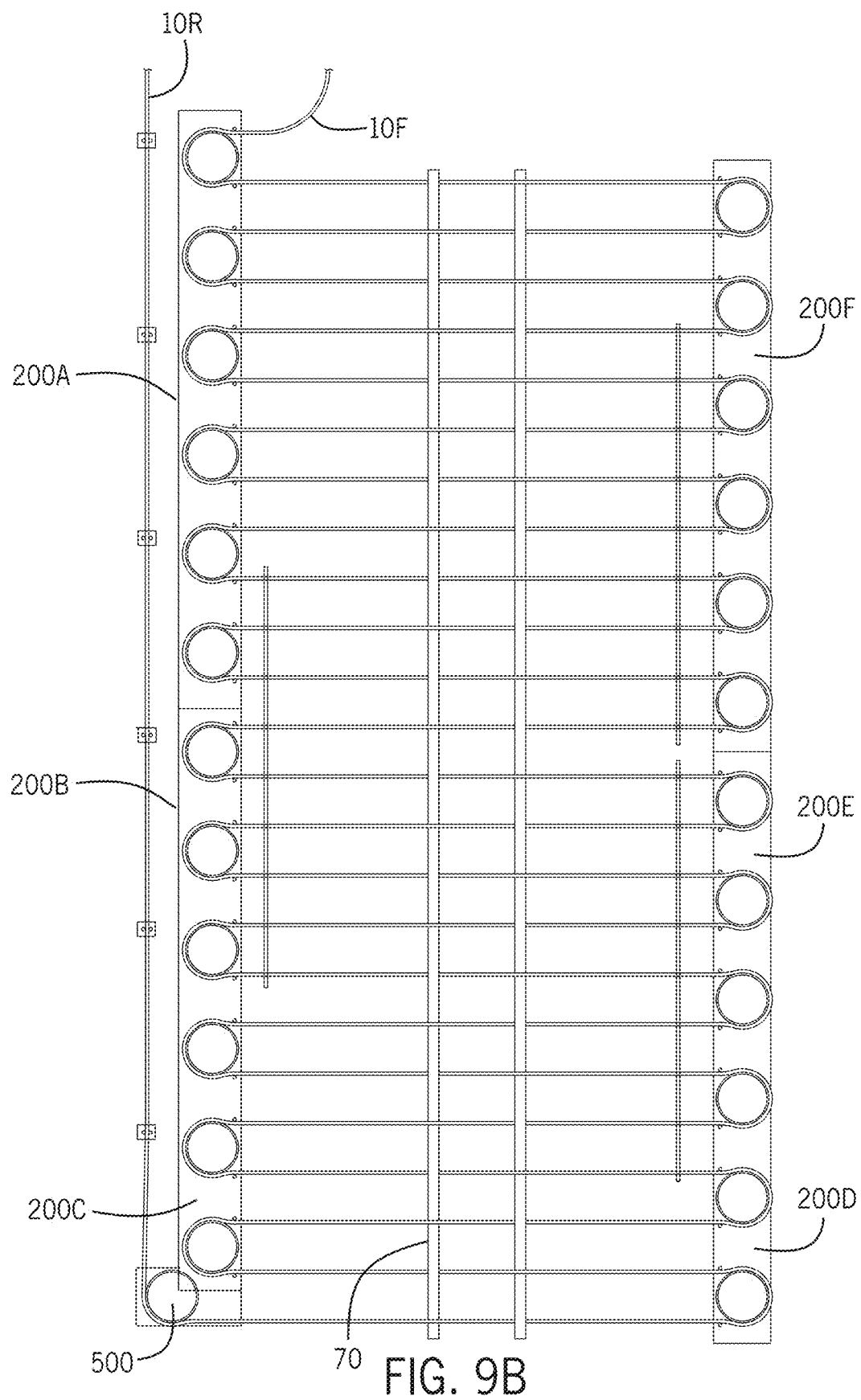
FIG. 9B is a top view of a schematic illustration of tubing with a post tensioning cable woven above and below the tubing in accordance with at least some embodiments provided herein.

FIG. 8 illustrates relative placement of the tubing within a flooring structure in accordance with various embodiments. As shown, the lower floor structure has a fixture 200 positioned thereon. The lower floor structure includes rebar 12 (e.g., no. 3 rebar) with wire mesh 14 positioned thereon. This provides support for the fixture 200, tubing 10, and, in post tension floors, the post tension cable 70. Anchors can attach the fixture 200 to any of the subfloor 5, the rebar 12, or the wire mesh 14. With the fixture 200 supported on the wire mesh 14, the tubing 10 can be routed through the fixtures and properly laid out. Once secured on the fixture 200 some of the tubing 10 can be pulled up as shown in FIG. 9A along "R." FIG. 9A is an end view of a schematic illustration of central spans of tubing being pulled off of the fixture 200 to weave the post tensioning cable 70 above and below the tubing 10. Once the post tension cable 70 is positioned, the tubing 10 can be returned to place on the fixture 200 as shown in FIGS. 8 and 9B. Once back in place, the tubing 10 can be permanently secured to either rebar 12 or wire mesh 14 via clips, brackets, fasteners, or wire ties 18, as shown in FIG. 8. After the tubing 10 is permanently secured to the lower floor structure, the fixtures can be removed. Once the fixtures are removed, the upper floor structure 16 can be positioned on top. After the structure is in place, concrete can be filled in. The structure of FIG. 8 is shown by way of example. It should be appreciated that other structures are also applicable. For example, this system can apply to a snowmelt system. Here, the fixtures and tubing 10 can be laid directly on a sand bed and staked into place. This structure can then be paved over with pavers or the like.

FIG. 10A-D are illustrations of tubing spool from a full end view (FIG. 10A) an end view with flange removed (FIG. 10B), and end view of a flange (FIG. 10C) and a side view in accordance with at least some embodiments provided herein. As discussed above, some building facilities have massive square footage that can result in the need to string in excess of 50 miles of tubing to form the radiant heating systems. While the fixtures discussed herein improve the efficiency of setting up such a system, providing a spool to help unspool the tubing onto the fixtures discussed herein also increases the installation efficiency. In accordance with one embodiment, a spool for uncoiling tubing 10 includes a hub 930 with flanges 910 and 920 on either side. Flange 920 can be removed to load a coil of tubing directly onto hub 930. The spool can include an axial aperture 950. In some embodiments, a handle can be placed through the aperture 950 allowing the spool to rotate about the handle 940. In some embodiments, a scrap portion of rebar can be used has the handle 940.

Figure 11A:
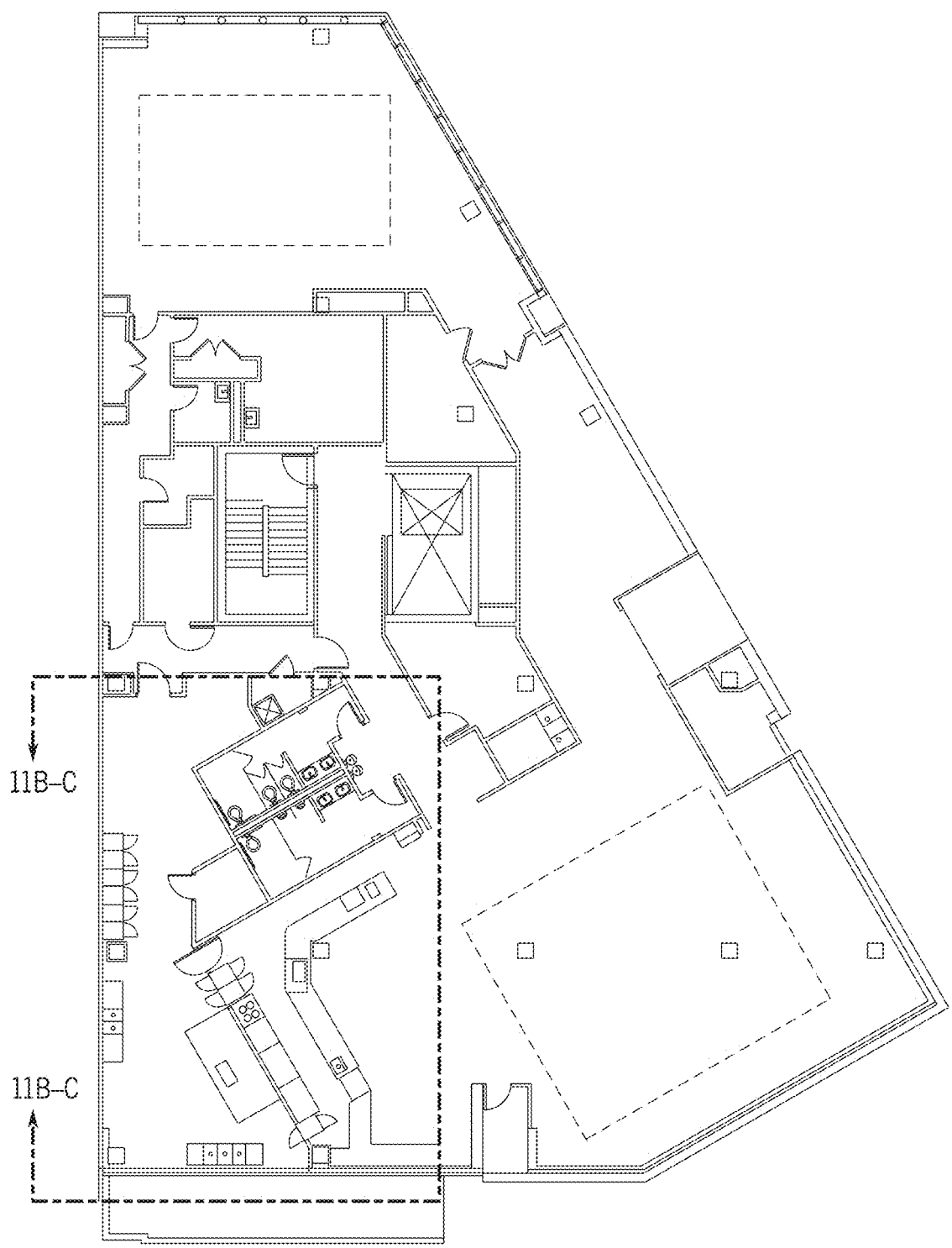
FIG. 11A is a plan mechanical schematic of a building construction project in accordance with at least some embodiments provided herein.
Figure 11B:
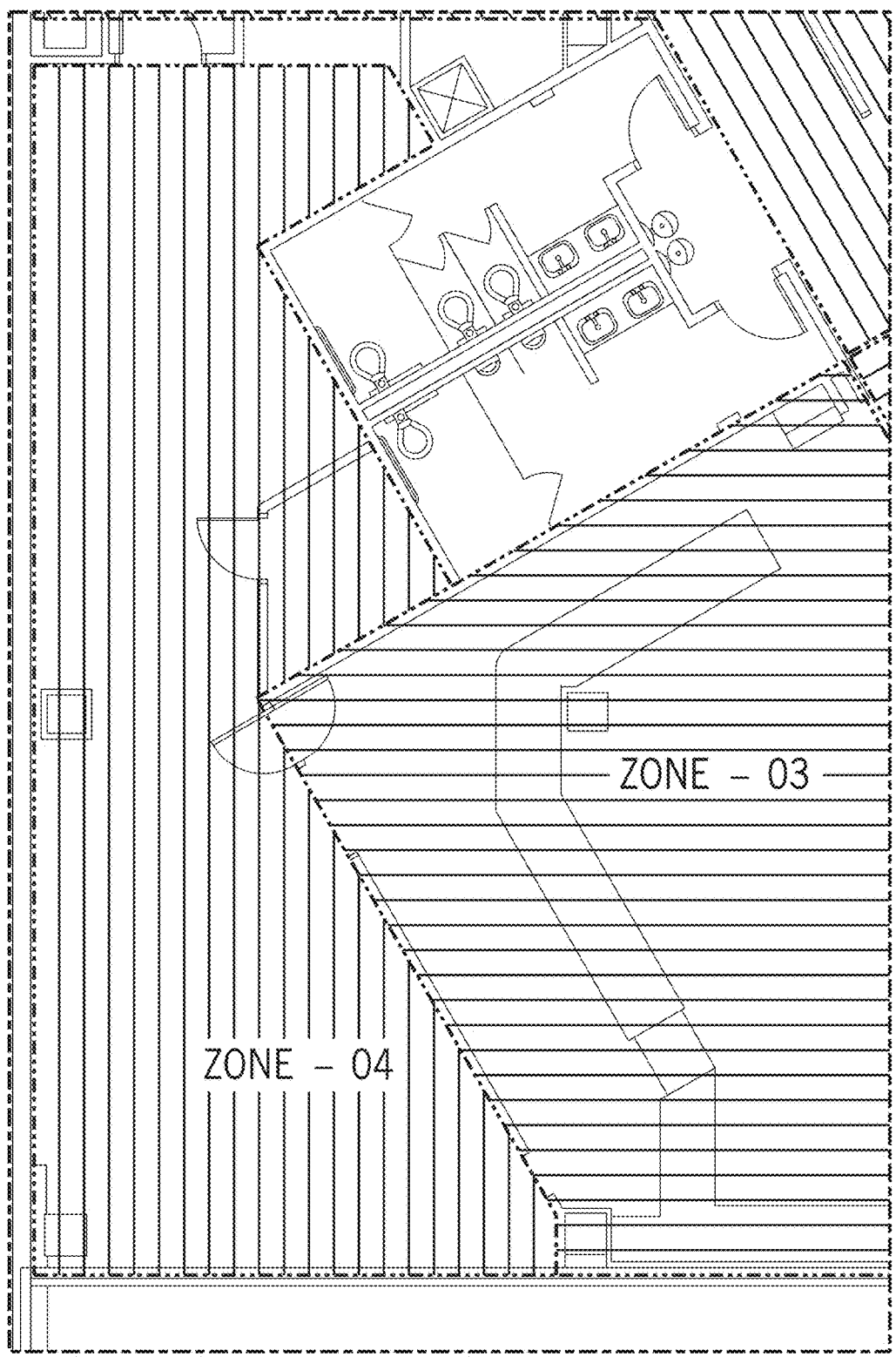
FIG. 11B is a detail plan mechanical schematic of multiple radiant heating zones of the building of FIG. 11A.
Figure 11C:
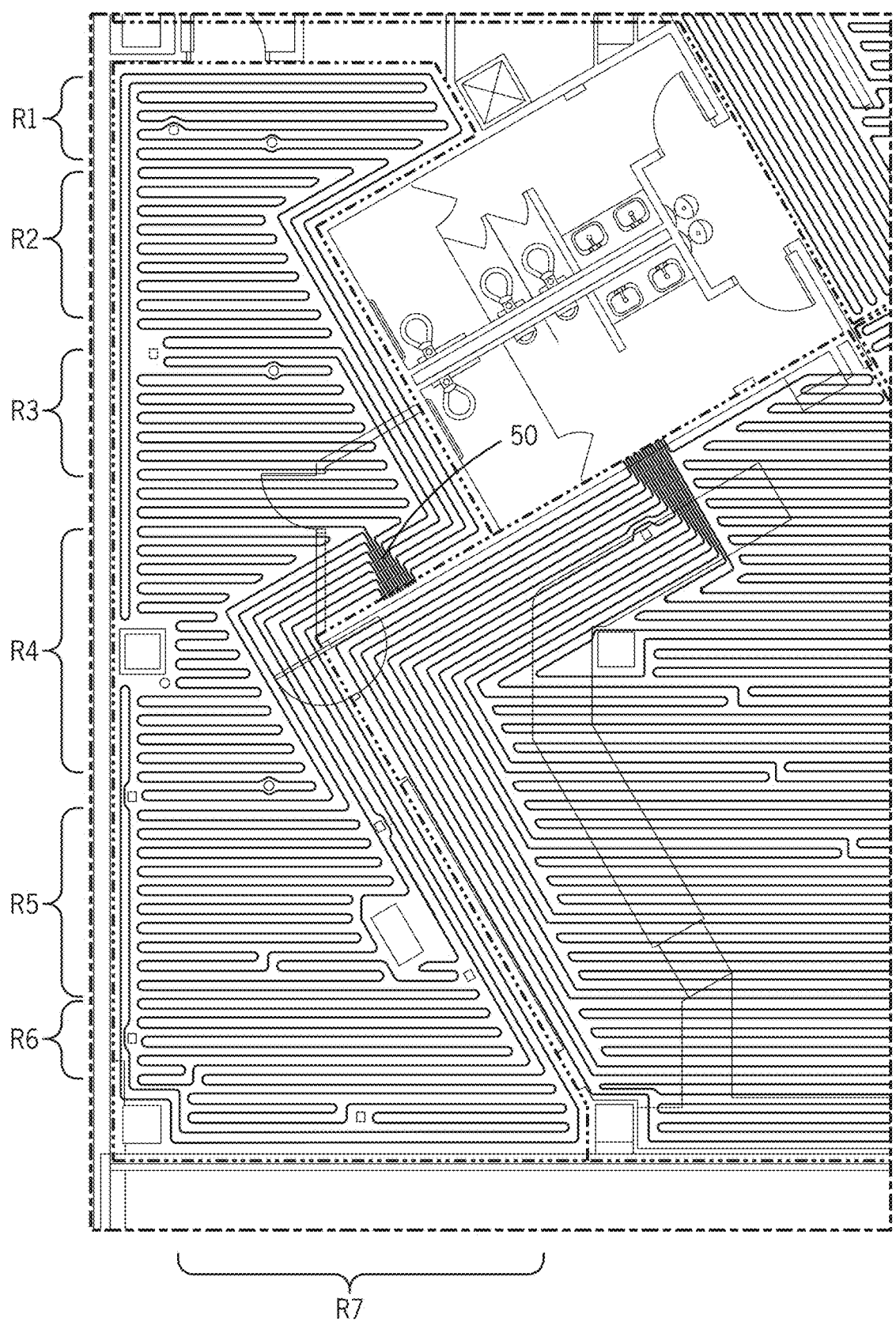
FIG. 11C is a detail plan mechanical schematic of multiple tubing runs within multiple radiant heating zones of the building of FIG. 11A.
Figure 11D:
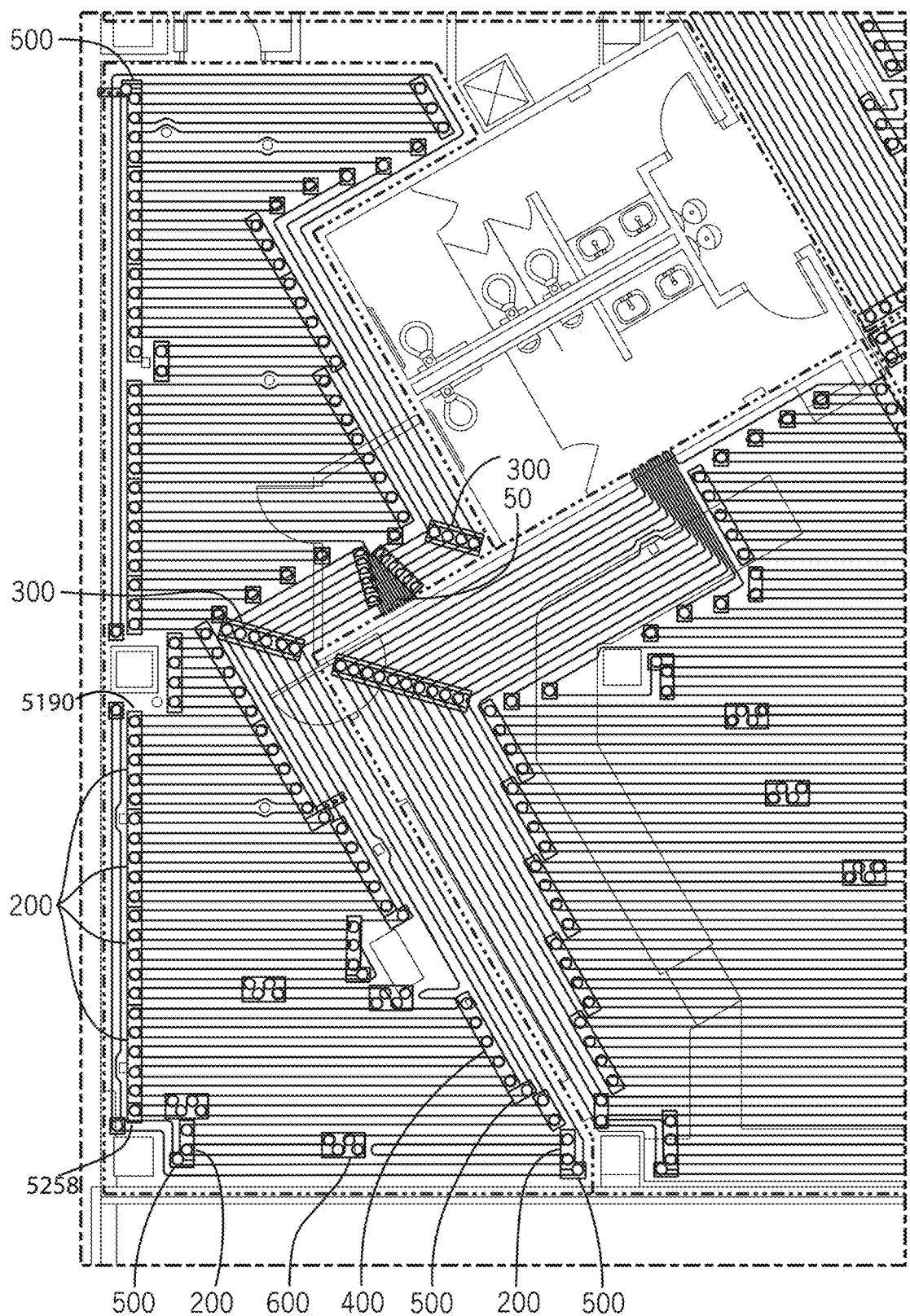
FIG. 11D is a detail plan mechanical schematic of multiple tubing runs overlaid with fixture locations within multiple radiant heating zones of the building of FIG. 11A.
Figure 11E:
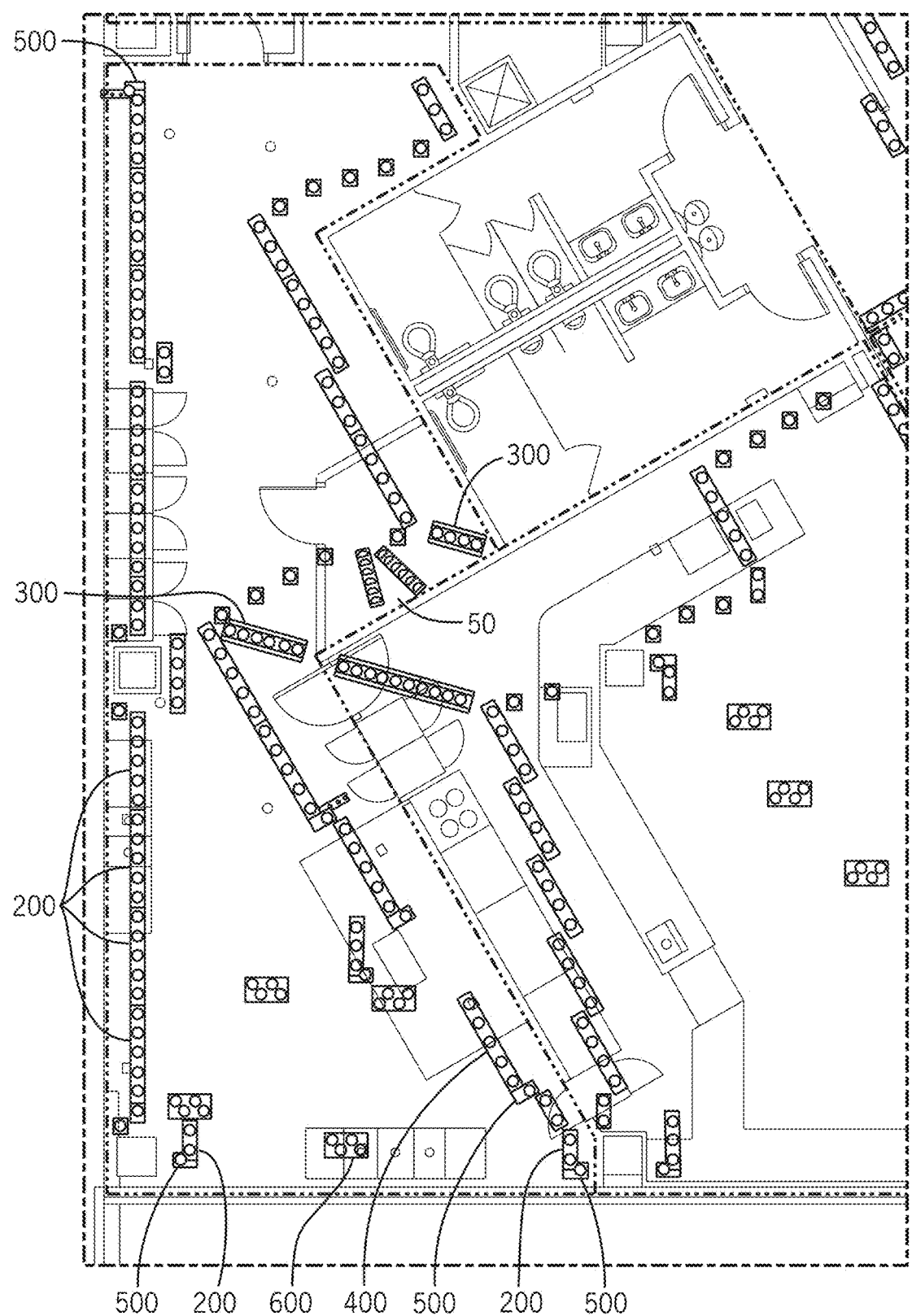
FIG. 11E is a detail plan mechanical schematic of fixture locations of the building of FIG. 11A.
Figure 12:
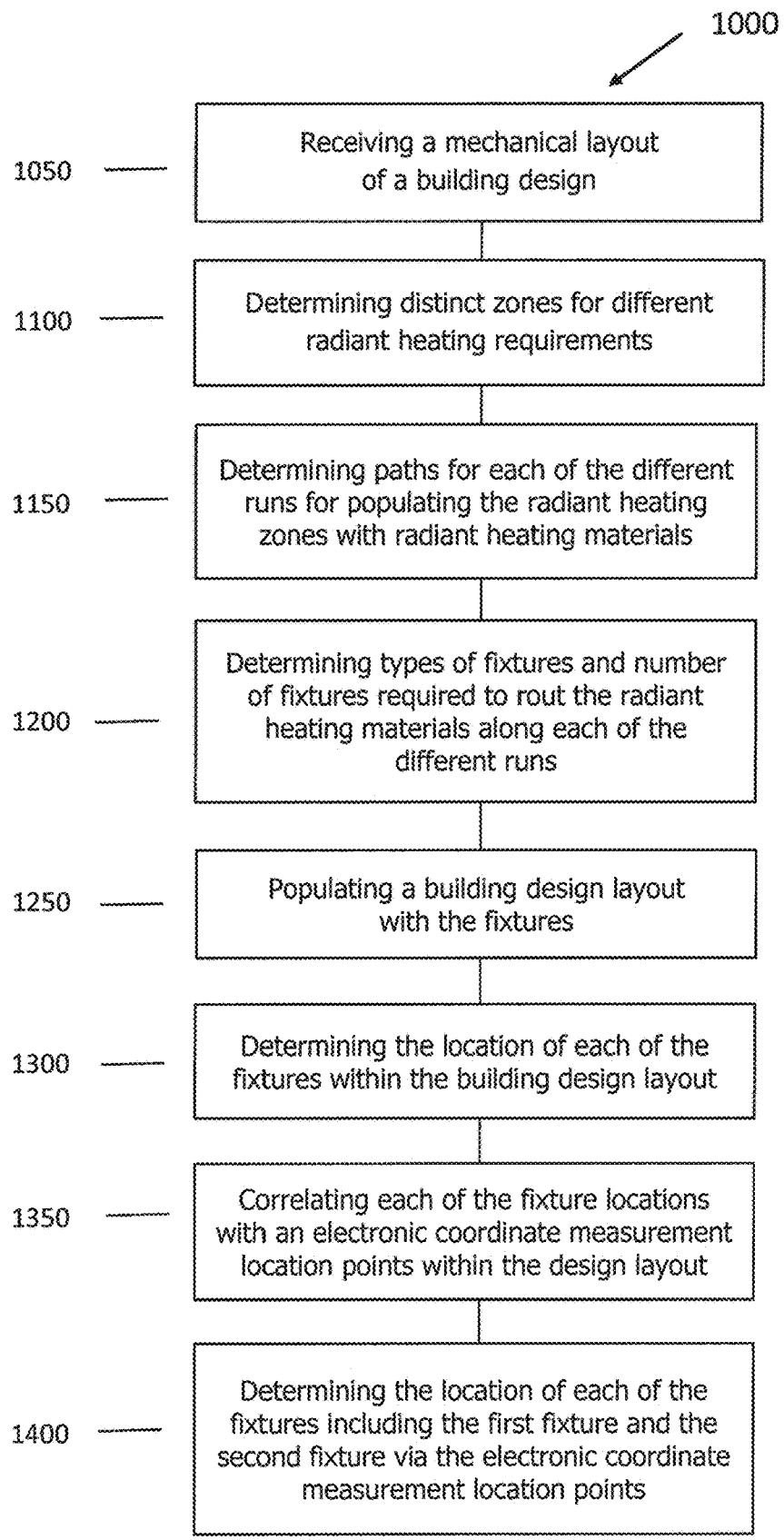
FIG. 12 is a process for installation of radiant heating material in accordance with at least some embodiments provided herein.
Figure 12:
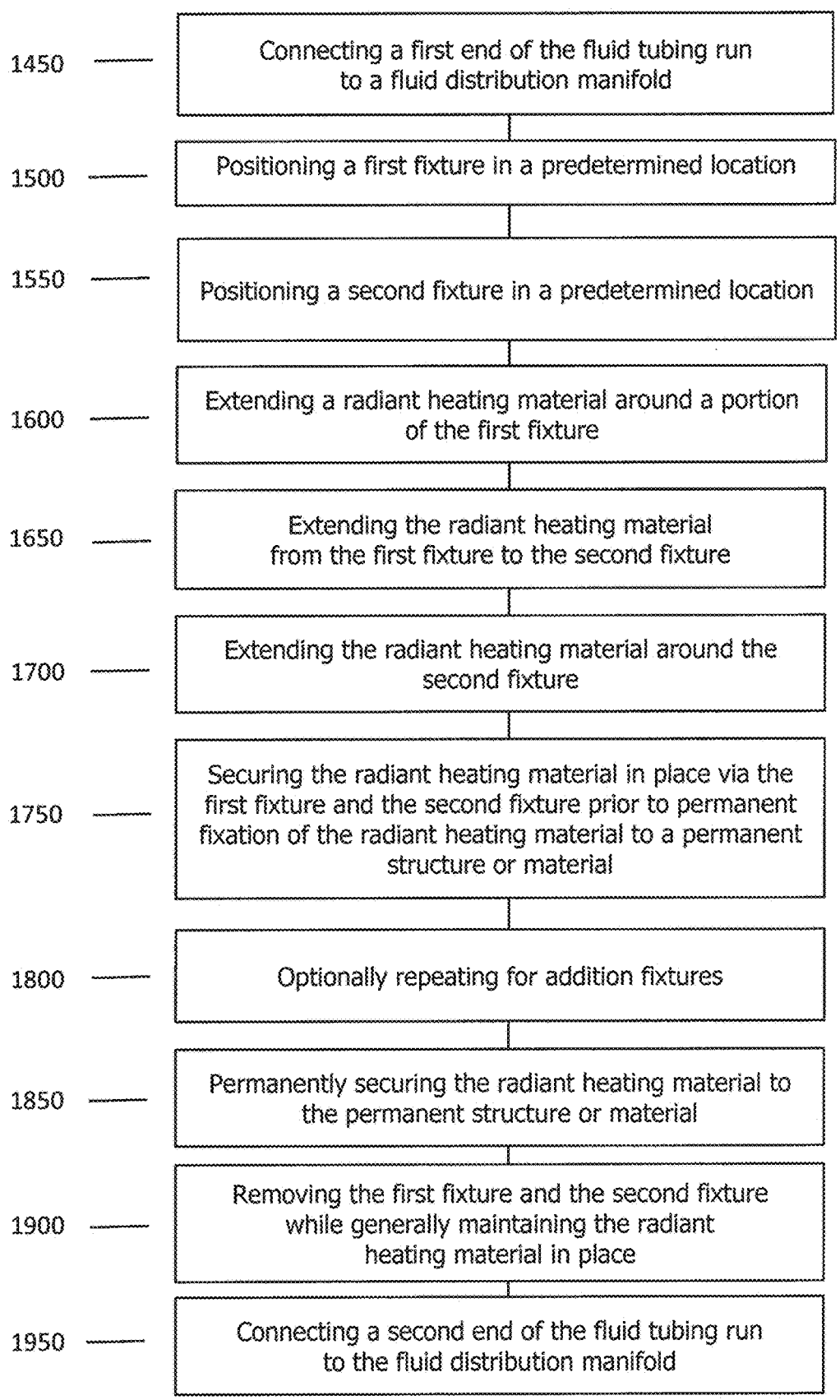

An example process 1000 for installation of radiant heating material is shown in FIG. 12. In accordance with this example, a mechanical layout of a building design (i.e. one under construction) is provided and/or received for the initial evaluation of the heating and cooling requirements (1050). FIG. 11A is an example of such a plan including a mechanical schematic of a building construction project. Distinct heating and cooling zones having a common plan or requirements are laid out (1100). A detailed view of the mechanical schematic of FIG. 11A is shown in FIG. 11B. FIG. 11B specifically shows the distribution of radiant heating zones within a portion of the building of FIG. 11A. For purposes of efficiency, zone 4 is used and discussed herein. Although, the concepts provided here are applicable to any of the other zones. Based on the mechanical schematics and zone analysis, radiant heating material paths are established for each of the zones (1150). While radiant heating materials are radiant heating applications that go beyond fluid conduits, for the sake of simplicity, fluid tubes/conduits will be referred to herein without being limiting of the scope. The various tubing paths can be broken down into separate runs. A run means a path that starts and ends at the manifold 50. Each zone can be made up of multiple paths. FIG. 11C specifically shows the distribution of radiant heating zones along with radiant heating tubes and their respective runs within the zones of the particular portion of the building of FIG. 11A. As shown, there are seven runs shown as R1-R7 in FIG. 11C. Each run is approximately the same length ranging from 240 feet to 295 feet in length. Based on this information, the types of fixtures, their numbers, and their locations are determined for the required routing of the radiant heating material along each of the different runs R1-R7 (1200). A building design layout can then be populated with the layout of the fixtures (1250). FIG. 11D is an example of the layout of multiple tubing runs overlaid with fixture locations of a portion of the building of FIG. 11A. Each of the fixtures locations can be determined (1300) and then these locations can be correlated with electronic coordinate measurement location points within the design layout (1350). An example of such a system is total station, which is an electronic theodolite integrated with an electronic distance measurement suitable to establish distances on the construction site based on data from the design layout. Within the design layout, each fixture can be located with a pair of points. FIGS. 11D and 11E show the various pairs of location tags via the four digit numbers that correlate to location information that can be used with the electronic theodolite. For example, the bank of fixtures 200 on the left side of the FIGS. 11D and 11E are located with point 5258 and 5190 tagged at opposite ends. Using the measurement system along with the design layout, the locations of each of the fixtures can be determined on the construction site based on the electronic coordinate measurement location points (1400).

In accordance with various embodiments, as illustrated in FIG. 12 Cont., the first end of the radiant heating tubing run can be connected to the distribution manifold 50 (1450). A first fixture can be positioned based on the predetermined location (1500). The predetermined location being determined, for example, according the above method. A second fixture can be positioned based on the predetermined location (1600). The radiant heating tubing can be extended around a portion of the first fixture (1600). The radiant heating tubing can be extended from the first fixture to the second fixture (1650). The radiant heating tubing can be extended around a portion of the second fixture (1700). The radiant heating tubing can be secured in place via the first fixture and the second fixture prior to permanent fixation of the radiant heating tubing to a permanent underlying structure e.g. wire mesh (1750). The process can optionally be repeated for additional fixtures (1800). Once the tubing is laid out, the radiant heating tubing can be permanently secured to the permanent underlying structure (1850). Each of the fixtures, including the first fixture and the second fixture, can then be removed while generally maintaining the radiant heating tubing in place (1900). The second end of the radiant heating tubing run can be connected to the fluid distribution manifold (1950).

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be understood by those within the art that, in general, terms used herein, and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. It is to be understood that such depicted architectures are merely examples and that, in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality, and any two components capable of being so associated can also be viewed as being "operably couplable", to each other to achieve the desired functionality.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A removable positioning fixture to temporarily retain tubing in a layout, the positioning fixture comprising:
    at least one support base;
    at least one deflection member defining a deflection region and extending from the at least one support base;
    a first tubing guide positioned on the at least one support base; and
    a second tubing guide positioned on the at least one support base;
    wherein in a first configuration,
        the at least one support base is removably positioned on a flooring structure running under the tubing,
        the at least one deflection member deflects the tubing extending along the deflection region,
        the first tubing guide associated with the at least one deflection member such that the association between the first tubing guide and the at least one deflection member retains the position of the tubing in a shape that conforms to the deflection region of the at least one deflection member,
        the second tubing guide is positioned with respect to the at least one deflection member such that the first tubing guide, the second tubing guide, and the at least one deflection member direct the tubing to form a turn;
    wherein in a second configuration,
        the tubing is fixed to the flooring structure by a fixed coupling at a connection point; and
        the support base and the deflection member are separated from the flooring structure without disturbing the fixed coupling of the tubing to the flooring structure at the connection point.

2. The positioning fixture of claim 1, wherein the tubing guide is a protrusion extending from the at least one support base.

3. The positioning fixture of claim 1, wherein:
    the at least one deflection member is a cylindrical deflection member of a plurality of cylindrical deflection members; and
    the first and second tubing guides form a set of tubing guides of a plurality of sets of tubing guides configured to form, in the first configuration, at least one of generally parallel run of the tubing.

4. The positioning fixture of claim 1, wherein in the second configuration the first tubing guide, the second tubing guide, the at least one deflection member, and the at least one support base of the positioning fixture are decoupled from the tubing upon an attachment of the tubing to a flooring structure below the positioning fixture.

5. The removable positioning fixture of claim 1, wherein the at least one tubing guide does not extend coextensively along a portion of the length of the deflection member.

6. The removable positioning fixture of claim 5, wherein the at least one tubing guide is a post.

7. The removable positioning fixture of claim 1, wherein the at least one deflection member is a first deflection member and in the first configuration the tubing is deflected in the sequence of the first tubing guide, the first deflection member, a second deflection member, and the second tubing guide.

8. The removable positioning fixture of claim 1, wherein the first and second tubing guides are each positioned on the support base at a location closer to an edge of the support base than to the deflection member to engage, in the first configuration, the tubing along its length at a location adjacent where the tubing crosses the edge of the support member and is directed away from the deflection member.

9. The positioning fixture of claim 1, wherein the first tubing guide and the second tubing guide are positioned on the same support base.

10. The positioning fixture of claim 1, wherein the at least one support base includes at least two support bases, and the first tubing guide and the second tubing guide are positioned on different support bases.

11. The positioning fixture of claim 1, wherein the at least one deflection member and one of the first tubing guide and the second tubing guide are positioned on the same support base.

12. The positioning fixture of claim 1, wherein the tubing at the turn changes direction by approximately 90 degrees.

13. The positioning fixture of claim 1, wherein in the first configuration the tubing is deflected in the sequence of contacting the first tubing guide, the at least one deflection member, and the second tubing guide.

14. The removable positioning fixture of claim 1, further comprising:
a second support base,
wherein
the at least one support base is a first support base and defines a first connector formed by a first outward extension extending outwardly from an end of the first support base and a first vertical extension extending upwardly from and relative to the first outward extension,
the second support base defines a second connector formed by a second outward extension extending outwardly from an end of the second support base and a second vertical extension extending downwardly from and relative to the second outward extension,
in the first configuration, the first support base and the second support base are coupled by the first connector and the second connector and removably positioned in the flooring structure, and
in the second configuration, the first support base and the second support base are separated and separated from the flooring structure.

15. A removable positioning fixture configured to temporarily retain tubing in a layout, the positioning fixture comprising:
at least one support base removably positioned on a flooring structure running under the tubing prior to permanent fixation of the tubing to the flooring structure;
at least one deflection member extending from the at least one support base to contact the tubing and deflect the tubing around a deflection region of the at least one deflection member; and
at least one tubing guide positioned on the at least one support base to retain the position of the tubing in a shape that conforms to the at least one deflection member;
wherein
the at least one tubing guide is a first tubing guide and a second tubing guide is positioned with respect to the at least one deflection member such that the first tubing guide and the second tubing guide deflect the tubing to form a turn,
the at least one support base and the at least one deflection member are each separate from and removable from the flooring structure when the tubing is fixed to the flooring structure, and
the at least one support base defines a connector to selectively engage a second support base, the connector formed by a first extension extending outwardly from an end of the support base and a second extension extending vertically from and relative to the first extension.

16. The removable positioning fixture of claim 15, wherein the tubing comprises a radiant heating tubing.

17. The removable positioning fixture of claim 15, wherein the at least one tubing guide does not extend coextensively along a portion of the length of the at least one deflection member.

18. The removable positioning fixture of claim 15, wherein in the first configuration the tubing deflects to form a 90 degree turn supported by the first and second tubing guides.

19. The removable positioning fixture of claim 15, wherein the at least one deflection member is a first deflection member and the tubing is deflected in the sequence of the first tubing guide, the first deflection member, a second deflection member, and the second tubing guide.

20. The removable positioning fixture of claim 15, wherein the first and second tubing guides are each positioned on the at least one support base to, in the first configuration, engage the tubing along its length at a location where the tubing is disengaged from the deflection member.

* * * * *